United States Patent
Botzas et al.

(10) Patent No.: US 9,049,410 B2
(45) Date of Patent: Jun. 2, 2015

(54) COLOR CORRECTION TO COMPENSATE FOR DISPLAYS' LUMINANCE AND CHROMINANCE TRANSFER CHARACTERISTICS

(75) Inventors: Anthony Botzas, San Jose, CA (US); Candice Hellen Brown Elliott, Santa Rosa, CA (US); Michael Francis Higgins, Cazadero, CA (US)

(73) Assignee: SAMSUNG DISPLAY CO., LTD. (KR)

( * ) Notice: Subject to any disclaimer, the term of this patent is extended or adjusted under 35 U.S.C. 154(b) by 606 days.

(21) Appl. No.: 12/646,897

(22) Filed: Dec. 23, 2009

(65) Prior Publication Data

US 2011/0149166 A1 Jun. 23, 2011

(51) Int. Cl.
| | |
|---|---|
| G09G 3/36 | (2006.01) |
| H04N 1/54 | (2006.01) |
| H04N 1/60 | (2006.01) |
| H04N 9/73 | (2006.01) |
| H04N 5/202 | (2006.01) |
| H04N 9/69 | (2006.01) |
| G09G 3/20 | (2006.01) |

(52) U.S. Cl.
CPC ............... *H04N 9/73* (2013.01); *H04N 5/202* (2013.01); *H04N 9/69* (2013.01); *G09G 3/2044* (2013.01); *G09G 3/2074* (2013.01); *G09G 2300/0452* (2013.01); *G09G 2320/0233* (2013.01); *G09G 2320/0242* (2013.01); *G09G 2320/0276* (2013.01); *G09G 2320/0285* (2013.01); *G09G 2340/06* (2013.10)

(58) Field of Classification Search
CPC ................... G09G 3/3607; G09G 2320/0233; H04N 1/6008; H04N 1/54; H04N 1/6005
USPC ........................................... 345/88; 348/649
See application file for complete search history.

(56) References Cited

U.S. PATENT DOCUMENTS

| | | | | |
|---|---|---|---|---|
| 2002/0048056 A1* | 4/2002 | Kubo | ............................. | 358/518 |
| 2002/0080289 A1* | 6/2002 | Koyama | ............................. | 349/5 |
| 2007/0030284 A1* | 2/2007 | Ogasawara et al. | ............ | 345/589 |
| 2007/0085916 A1* | 4/2007 | Nishio | ........................... | 348/241 |
| 2009/0102769 A1* | 4/2009 | Kouno et al. | ..................... | 345/88 |

* cited by examiner

*Primary Examiner* — Xiao Wu
*Assistant Examiner* — Matthew D Salvucci
(74) *Attorney, Agent, or Firm* — Innovation Counsel LLP

(57) ABSTRACT

Displays are provided with circuitry performing color correction to compensate for the displays' luminance and chrominance transfer characteristics. Some techniques are suitable for RGBW displays and for subpixel-rendered displays. Some displays include an external light source (e.g. a backlight unit in LCDs), and the color correction is coordinated with dynamic control of the light source.

7 Claims, 13 Drawing Sheets

COLOR CORRECTION TO COMPENSATE FOR DISPLAYS' LUMINANCE AND CHROMINANCE TRANSFER CHARACTERISTICS

BACKGROUND OF THE INVENTION

The present invention relates to image processing, and more particularly to color correction for displaying an image.

In digital image processing, an image is typically represented as a number of pixels. Each pixel's color is defined by the color's coordinates in some color space, e.g. sRGB. The display converts the color coordinates to "grey levels" which are then used to define electrical signals (e.g. voltages) that determine luminous states of corresponding areas on the screen of the display. (Sometimes, the color coordinates themselves can be used as grey levels.) The luminance displayed in the screen area is some function (called "gamma function", "gamma transfer function", "gamma transfer characteristic", or "gamma curve") of the corresponding grey level.

For many displays, the gamma function is non-linear, and can be approximated by a power relationship:

$$L = v^\gamma \quad (1)$$

where L is the luminance, v is the grey level, and γ is a constant for the display. In many CRT (Cathode Ray Tube), LCD (Liquid Crystal Display), and some other types of devices, γ is about 2.2.

For many displays, the relationship (1) is only approximate, and can be corrected using look-up tables (LUTs) containing experimental data obtained for a given display and stored in the display.

A typical color display is associated with a set of primary colors, e.g. red, green and blue. The display accepts separate grey levels for each of the primary colors (i.e. for each "channel"). The gamma functions can be different for different channels, and therefore separate LUTs can be provided for each channel.

For example, a color LCD may include a number of red, green and blue subpixels. The subpixels have identical liquid crystal cells, but have color filters of different colors (red, green, blue). The liquid crystal cells however have different optical activity with respect to wavelength and hence to color. Depending on the spectral bandwidth of the color filters, such optical activity can result in unequal luminance gamma transfer characteristics amongst the R, G, B channels. In addition, the optical activity can result in chrominance deviations (e.g. hue deviations) within each channel. The unequal gamma transfer characteristics can be corrected using the separate LUTs for each channel. The chrominance deviations have not been considered a serious problem for the RGB LCDs due to the narrow spectral bandwidth of the color filters.

SUMMARY

This section summarizes some features of the invention. Other features may be described in the subsequent sections. The invention is defined by the appended claims, which are incorporated into this section by reference.

Any color correction performed to adjust the color data to the transfer characteristic of a display will be called herein "automatic color correction" or ACC. As used herein, the term "transfer characteristic" is a general term which covers both the gamma transfer characteristic (i.e. luminance characteristics) and chrominance characteristics (e.g. chrominance shift of the white subpixels).

In RGBW displays, the white subpixels have a high spectral bandwidth, and the chrominance deviations in the white channel can be significant. The chrominance deviations in the white channel can be compensated by adjusting luminances of the R, G and B grey levels, as described in U.S. patent application published as US 2008/0252797 A1 on Oct. 16, 2008, filed by Hamer et al., incorporated herein by reference. This patent application describes white chrominance correction for OLED (organic light emitting diode) displays, and states that the invention of that patent application can be applied to LCDs. The OLED display has red, green blue and white emitters. First, experiments are performed to measure the white chrominance deviations. More particularly, the white emitters are turned on at different intensities, and for each intensity the corresponding color actually displayed is measured and recorded in linear RGB coordinates. In this manner, three curves are obtained R(W), G(W), B(W) which provide the linear R, G, and B coordinates for each W value. These three curves, and the corresponding inverse functions W(R), W(G), W(B), are recorded as tables and stored in the display.

The display receives image data in some color space such as sRGB, and converts such data to linear RGB. Then the linear RGB data are converted to RGBW in such a way as to correct the white chrominance. More particularly, let us denote a pixel's linear RGB coordinates as Rp, Gp, Bp. The display calculates the corresponding RGBW coordinates Rw, Gw, Bw, Ww as follows. The white coordinate Ww is set to the minimum of W(Rp), W(Gp), W(Bp), or to some number below the minimum. (A number below the minimum can be used in order to obtain greater spatial uniformity of luminance in displaying near-white colors.) The coordinates Rw, Gw, Bw are obtained by subtracting the values R(Ww), G(Ww), B(Ww) from the corresponding RGB coordinates, i.e.:

$$Rw = Rp - R(Ww)$$

$$Gw = Gp - G(Ww)$$

$$Bw = Bp - B(Bw)$$

OLED displays are also addressed by U.S. patent application published as US 2006/0262053 A1 on Nov. 23, 2006, filed by Lee et al.

In some embodiments of the present invention, ACC is performed by determining a suitable correction of the color coordinates (such as RGBW) for each combination of values of the color coordinates. For example, suitable tables can be generated which provide corrected coordinates for each combination of the coordinate values. However, such tables can be quite large. If computational circuitry is used in lieu of the tables, the circuitry can be complex. Therefore, in some embodiments, the following techniques are used. In some RGBW embodiments, the white chrominance correction is calculated in terms of the RGB coordinates. Also, conventional tables can be used to correct the luminance of the red, green, blue and white colors. If an input color is a shade of grey, then the white chrominance correction table and the white luminance correction table can be used to correctly display the color. If the color is fully saturated, then the white coordinate is zero, and the red, green and blue luminance tables provide a correct display of the saturated color. If the input color is neither white nor fully saturated, then interpolation is used between (i) the white color defined by the white coordinate and (ii) the fully saturated color defined by the RGB coordinates.

Further, the inventors have observed that in RGBW displays, color correction presents a special challenge if the display uses a dynamically controlled light source. For example, LCD subpixels do not emit light, so the LCD may include a backlight panel containing a separate light source 110 (FIG. 1) which illuminates the subpixels in screen unit 120. Light source 110 is located behind the subpixels. In LCDs, screen unit 120 is sometimes called an LCD panel, and it contains screen driver circuitry 124 which drives the subpixels (not shown) in screen 126. The light source 110 can be dynamically controlled (i.e. controlled based on the image displayed) to reduce power consumption. If the image is dark, the light source is operated at a lower output power, and the subpixels are made more transmissive to compensate for the lower output of the light source. Making the subpixels more transmissive is achieved by increasing the subpixel values (the grey levels). For example, if the sRGB input data are converted to a linear RGBW representation (by block 130 of FIG. 1), and the light source power is reduced by some factor BL (i.e. is multiplied by the factor BL<1 as determined by block 140), then the RGBW values can be multiplied by the inverse of BL (denoted INVy and determined by block 140). In FIG. 1, the multiplication is performed by scaling block 150. The scaled RGBW values are then converted to grey levels (denoted Rg, Gg, Bg, Wg for the respective red, green, blue and white subpixels) by "output gamma" block 160. Dynamic control of the light source is sometimes called Dynamic Backlight Control or DBLC.

Some embodiments of the present invention correct the white chrominance and the RGB luminance while performing RGBW conversion 130. However, the correction may be invalid for the scaled RGBW values (the output of block 150). Therefore, image degradation can be high. Other embodiments perform the color correction on the scaled data (the output of block 150). However, once the scaled data are color-corrected, the scaling parameters BL, INVy may be non-optimal, resulting in unnecessarily high power consumption and/or brightness distortion. In some embodiments, various techniques are used to provide low image degradation and low power consumption. For example, in some embodiments, the interpolation technique described above can be incorporated into output gamma 160.

Another challenge is presented in subpixel-rendered (SPR) displays, regardless of whether or not the displays use an external light source. In non-SPR displays, each image pixel is mapped into a separate set of subpixels which can display any primary color. In SPR displays, to reduce the number of the subpixels, a pixel can be mapped into a subpixel area which lacks one or more primary colors. Also, or in the alternative, a subpixel of some primary color may be shared by multiple pixels. In such cases, a subpixel's value may be determined from information on multiple pixels in a subpixel rendering (SPR) operation. The inventors have discovered that some ACC techniques may work well when applied to the subpixel values generated by the SPR operation. Surprisingly, some ACC techniques work well when applied to the RGBW data before the SPR operation. This is surprising because the SPR operation changes the RGBW data and hence may invalidate the color corrections performed before the ACC.

Some embodiments include novel methods of constructing the ACC tables to reduce the table size and increase the maximum image brightness available for many images. Increased brightness is highly valued in portable, battery-operated devices such as mobile telephones, but the invention is not limited to such devices.

This summary is just a brief introduction to some features of the invention. The invention is not limited to RGBW displays, but covers displays using other primaries, e.g. cyan. The invention is not limited to the features and advantages described above except as defined by the appended claims.

DESCRIPTION OF SOME EMBODIMENTS

The embodiments described in this section illustrate but do not limit the invention. The invention is defined by the appended claims.

Some embodiments of the present invention modify the display of FIG. 1 as follows. The color correction is incorporated into the output gamma block 160. The display may or may not use DBLC, and in particular the DBLC block 140 and scaler 150 may or may not be present. Light source 110 may or may not be present, and in particular the display may be non-LCD type. The display may use LUTs or computational circuitry, or combination of the two. For example, some values can be stored in LUTs, white other values can be interpolated from the LUT values. For ease of description, the examples described below use tables, but these examples are not limiting.

Figure 2:
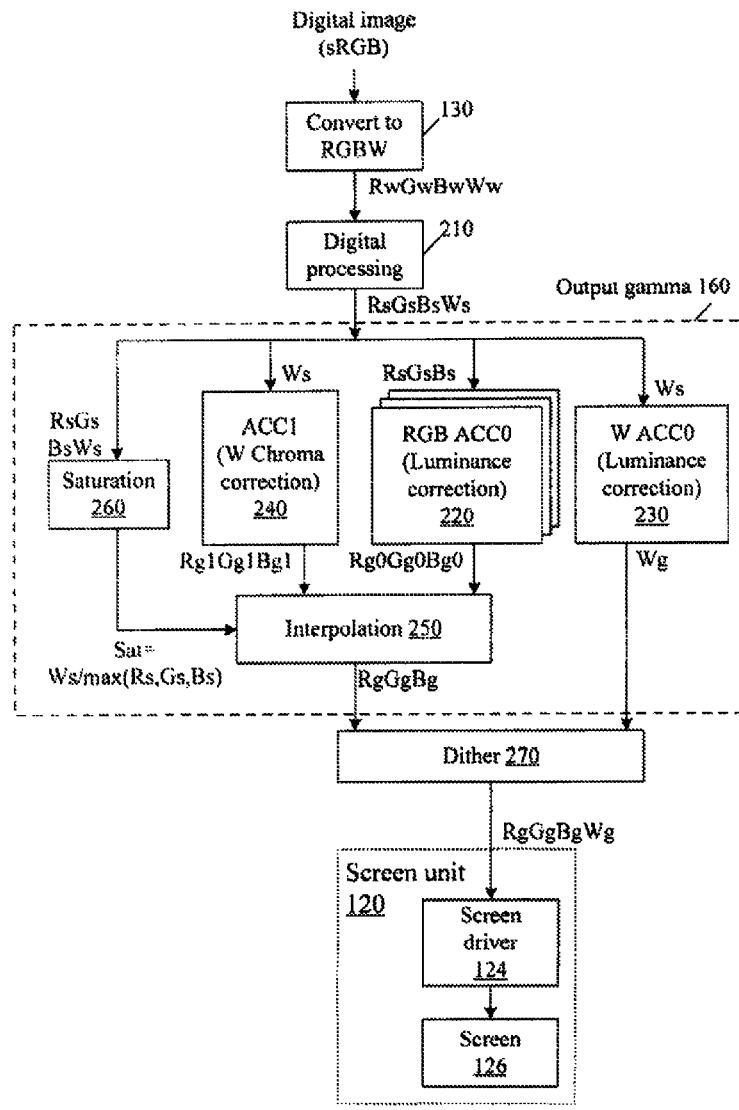
FIGS. 2 and 3 are block diagrams of displays according to some embodiments of the present invention.

FIG. 2 illustrates a block diagram of a display with such tables 220, 230, 240 in output gamma block 160.

The color correction technique illustrated in FIG. 2 will be called a "vector method" herein. Output gamma block 160 receives subpixel values Rs, Gs, Bs, Ws for the subpixels and generated the grey values RgGgBgWg for screen driver 124. Each subpixel value corresponds to the corresponding subpixel's luminance when the subpixel will emit the corresponding primary color. The input values RsGsBsWs are possibly, but not necessarily, linear with respect to luminance. In the example of FIG. 2, the display receives sRGB data, converts them to possibly (but not necessarily) linear RGBW coordinates RwGwBwWw, and processes these coordinates to generate the subpixel values RsGsBsWs by digital processing block 210. The invention is not limited to sRGB or any particular kind of processing in block 210. Block 210 may include a scaler 150 or a DBLC block 140 as in FIG. 1, and/or an SPR rendering unit, and/or some other units, or block 210 may be absent (i.e. the RsGsBsWs data can be identical to RwGwBwWw). The display may or may not be an SPR display.

Output gamma block 160 has ACC tables "ACC0" for luminance correction, and "ACC1" for white chrominance correction. The ACC0 tables 220, 230 include a separate table for each primary color. The ACC0 tables 220 are the three tables for the red, green and blue primaries, and the ACC0 table 230 is the table for the white primary. The RGB tables 220 can be conventional tables used in prior RGB displays. The grey values stored in these tables are shown as Rg0, Gg0, Bg0. For example, for each red value Rs, the ACC0 table 220 for the red primary returns the corresponding grey value Rg0. The green and blue ACC0 tables are similar. Tables 220 can be constructed by conventional techniques. For example, for the red primary, the gamma function for the display is constructed by turning on just the red pixels (i.e. supplying the RgGgBgWg values to screen driver 124 with Gg=Bg=Wg=0), and measuring the luminance of the image on screen 126. The gamma function is inverted to obtain the ACC table for the red primary. The green and blue ACC tables are constructed in a similar manner.

White ACC table 230 returns a white grey value Wg for each input white subpixel value Ws. Table 230 can be constructed in the same way as tables 220.

ACC1 table 240 converts a white subpixel value Ws into a triple of RGgrey values Rg1, Gg1, Bg1 which represent the red, green and blue grey values needed to compensate for the white chrominance shift present when the white grey value Wg from white ACC0 table 230 is supplied to screen unit 120.

For fully saturated colors (i.e. for colors having at least one sRGB coordinate equal to zero), Ws will typically be zero, and the RGB ACC0 tables 220 will provide correct grey values Rg0, Gg0, Bg0 which can be passed unchanged by interpolation block 250 (described below). These values (shown as RgGgBg at the output of interpolation circuit 250) are passed to screen unit 120 through dither block 270. When Ws=0, white ACC0 table 230 returns zero grey value Wg. Thus, the color correction in block 160 works well for fully saturated colors.

Interpolation block 250 performs interpolation between the RgGgBg outputs of tables 220, 240 based on a saturation parameter Sat output by block 260 and indicative of the color saturation. For example, in some embodiments, $$Sat = Ws / \max(Rs, Gs, Bs, 1) \tag{2A}$$

where "1" is added on the right to avoid division by zero. In this case, the Sat parameter indicates the inverse of the saturation. In some embodiments, the subpixel values Rs, Gs, Bs, Ws are weighted with relative luminances. For example, let $Y_r$ denote the luminance of screen 126 when the red subpixels are maximally emissive and all the green, blue and white subpixels are minimally emissive. The $Y_g, Y_b, Y_w$ be defined in a similar manner for the green, blue, and white subpixels. Then in some embodiments:

$$Sat = (Ws \cdot Y_w) / \max[(Rs \cdot Y_r), (Gs \cdot Y_g), (Bs \cdot Y_b), 1] \tag{2B}$$

Interpolation in block 250 can be linear or some other kind. For example, in some embodiments, linear interpolation is used, and Sat changes from 0 to 1 inclusive. For example, in the case (2A), the RGBW conversion 130 is performed so Ww does not exceed max(Rw, Gw, Bw), and digital processing 210 is such that Ws does not exceed max(Rs, Gs, Bs). Consequently, Sat is at least 0 and at most 1. In some such embodiments, denoting the block 250 output as RgGgBg:

$$Rg = Sat \cdot Rg1 + (1-Sat) \cdot Rg0$$

$$Gg = Sat \cdot Gg1 + (1-Sat) \cdot Gg0$$

$$Bg = Sat \cdot Bg1 + (1-Sat) \cdot Bg0 \tag{3}$$

In some embodiments, if the color is white or grey, and Sat is defined by (2A), then Rs=Gs=Bs=Ws, so Sat=1. Therefore, in case of (3), the interpolation output (Rg, Gg, Bg)=(Rg1, Gg1, Bg1), i.e. the white or grey color display will be accurate.

Polynomial or some other kind of interpolation can also be used, or some other kind of combination of the outputs of tables 220, 240. For example, in some embodiments, $$Rg = (Sat \cdot Rg1^{2.2} + (1-Sat) \cdot Rg0^{2.2})^{1/2.2}$$

$$Bg = (Sat \cdot Gg1^{2.2} + (1-Sat) \cdot Gg0^{2.2})^{1/2.2}$$

$$Rg = (Sat \cdot Bg1^{2.2} + (1-Sat) \cdot Bg0^{2.2})^{1/2.2}$$

Of note, even though Sat may be thought of as the inverse of the saturation, the value Sat for a given color depends on the choice of the color's RGBW representation Rs, Gs, Bs, Ws (i.e. the choice of metamer as described below). As is well known, for most colors, the RGBW representation is not unique. The value Sat is thus indicative of the relative magnitude of the Ws coordinate versus the Rs, Gs and Bs coordinates.

In some embodiments, in order to reduce the circuit size (the gate count), the interpolation is performed on some but not all of the RGB grey values. For example, the red and blue grey values Rg, Bg can be obtained as in equations (3), but the green grey value Gg can be set to Gg1 or Gg0.

In some embodiments, the interpolation can also be performed on the white grey values. For example, tables 220 can be modified to provide a white grey value Wg0 as appropriate for each set of the RsGsBsWs values. Interpolation block 250 can generated Wg by interpolating between the Wg0 value and the value Wg generated by table 230. These examples are not limiting.

Dithering block 270 is optional, and can be used when the RgGgBgWg output of output gamma 160 must be truncated. For example, in some embodiments, the grey values accepted by screen unit 120 are 8-bit wide, but the grey values generated by output gamma 160 are 10-bit wide. Spatial, temporal, or spatial-temporal dithering can be performed using known techniques, and other truncation techniques can also be used.

In some embodiments, the white ACC0 table 230 is constructed to at least approximate the inverse of the gamma function of screen unit 120 for the white subpixels.

More particularly, in some embodiments, the ACC0 and ACC1 tables are constructed as follows.

A set of optical measurements is taken of the display by supplying appropriate grey values Rg, Gg, Bg, Wg to screen unit 120. More particularly:

1. The chromaticity and the luminance of the brightest R, G, B and W primaries are obtained. More particularly, for one of the primaries, the corresponding grey value Rg, Gg, Bg, or Wg at the input of screen unit 120 is set to maximum value (e.g. 255), and the remaining grey values are zero for the entire screen; if a backlight unit is used, its output power is maximized. The chromaticity (e.g. in CIE xy coordinates) and the luminance are then measured. In some embodiments, for the R, G, and B coordinates, the radiance is measured instead of the luminance because luminance measurements are sometimes too noisy.

2. For each of the four primaries, the primary's grey value is ramped from 0 to the maximum value while the other primaries' grey values are held at zero. For each value in the ramp, the primary's luminosity is measured. In some embodiments, the grey values are 8-bit wide, and each primary is ramped by being set to 0, 8, 16, . . . , 240, 248, 255 (33 points).

3. For the W ramp, the chromaticity is recorded for each Wg value in CIE xy coordinates.

For example, when these measurements were performed on a sample DID (Digital Information Display) LCD panel, the following results were obtained. The CIE xy measurements on the brightest primaries were:

|   | R | G | B | W |
|---|---|---|---|---|
| x | 0.633 | 0.287 | 0.156 | 0.2815 |
| y | 0.328 | 0.623 | 0.051 | 0.2657 |
| z | 0.039 | 0.09 | 0.793 | 0.4528 |

The luminosity measurements of the brightest primaries, when normalized to the sum of 1.0, were as follows:

|   |          |
|---|----------|
| R | 0.062542 |
| G | 0.245172 |
| B | 0.038776 |
| W | 0.653509 |

These values were used with well known colorimetric algebra to generate the following two matrices. The first matrix converts normalized RGBW measurements to CIE XYZ coordinates. This matrix was:

$$\begin{Vmatrix} 0.120698 & 0.112945 & 0.118610 & 0.692371 \\ 0.062542 & 0.245172 & 0.038776 & 0.653509 \\ 0.007436 & 0.035418 & 0.602935 & 1.113696 \end{Vmatrix}$$

The second matrix, denoted "R2X" below, consists of the first three columns of the first matrix and converts linear RGB to CIE CYZ:

$$\begin{Vmatrix} 0.120698 & 0.112945 & 0.118610 \\ 0.062542 & 0.245172 & 0.038776 \\ 0.007436 & 0.035418 & 0.602935 \end{Vmatrix}$$

The luminosity measurements of the ramped primaries can be used in known ways to construct an output gamma curve for each primary. The gamma curves can be inverted to construct the ACC0 tables 220, 230.

The ACC1 table 240 can then be constructed as follows.

1. For some range of Ws values, e.g. each possible value, the CIE XYZ coordinates of the "ideal" white color are determined. For example, suppose that Ws can vary from 0 to 255, and the ideal white color is some color DD. For example, DD may have the chromaticity of D65 and the luminance of the brightest white primary measured as mentioned above. Suppose that the output gamma for the white primary is the power function (1) with γ=2.2, or a function with close values. The ideal white XYZ coordinates, denoted as $C2_i$, will then be $$C2_i = DD*(i/255)^{2.2}, \text{ where } i=0, 1, 2, \ldots 255 \quad (4)$$

2. Let us denote the corresponding 256 coordinates of the measured white primary as $WXYZ_i$. These coordinates can be obtained from the luminance and chromaticity measurements of the white primary as described above, when Wg=i is ramped from 0 to 255. As stated above, in some embodiments, the measurements are made only for a sub-range Wg=0, 8, 16, . . . . In this case, the remaining $WXYZ_i$ values can be obtained by interpolation (e.g. linear or some other type of interpolation).

The desired white chrominance correction for each value Wg=i can then be expressed in CIE XYZ coordinates as:

$$SUM_i = C2_i - WXYZ_i \quad (5)$$

These colors can be converted to the linear RGB coordinates using the matrix R2X described above, to obtain:

$$ACC1_i = R2X^{-1} SUM_i \quad (6)$$

Thus if Ws corresponds to the white ideal color $C2_i$, i.e.

$$Ws = \text{const}*(i/255)^{2.2} \quad (7)$$

where "const" is a constant dependent on the bit width of Ws, then $ACC1_i$ is the desired RGB correction in the linear RGB coordinates corresponding to the display's primary RGB chromaticities. The linear RGB coordinates of the $ACC1_i$ vectors are then submitted as inputs to the RGB ACC0 tables 220, and the outputs of the RGB ACC0 tables are stored in ACC1 table 240 for the respective Ws values (7) rounded to an integer. For the remaining Ws values, the ACC1 table entries can be interpolated, or omitted altogether and obtained by interpolation when displaying an image.

In some embodiments, the choice of the white-point DD affects how well the white chromaticity can be corrected. If the DD chromaticity is chosen as the chromaticity of the color produced when all the red, green, blue and white emitters are maximally emissive, then the ACC correction will be small and the ACC will be more accurate. Alternatively, the DD chromaticity can be chose as the chromaticity of the color produced when the white emitters are maximally emissive and the red, green and blue emitters are minimally emissive.

If the maximum ACC1 correction is small, then the RgGgBg output of interpolation block 250 is less likely to overflow or underflow, resulting in a greater range of allowable values Rg0Gg0Bg0 of ACC0 tables 220, and hence in a greater range of allowable values RsGsBs at the output of processing block 210. (If an overflow or underflow occurs, the grey value Rg, Gg, or Bg may be hard-clamped to the maximum or minimum allowable value, or more complex gamut mapping may be performed using known techniques; see e.g. U.S. patent application published as no. 2007/0279372 A1 published on Dec. 6, 2007, filed by Brown Elliott et al., entitled "MULTIPRIMARY COLOR DISPLAY WIITH DYNAMIC GAMUT MAPPING", incorporated herein by reference.)

Figure 3:
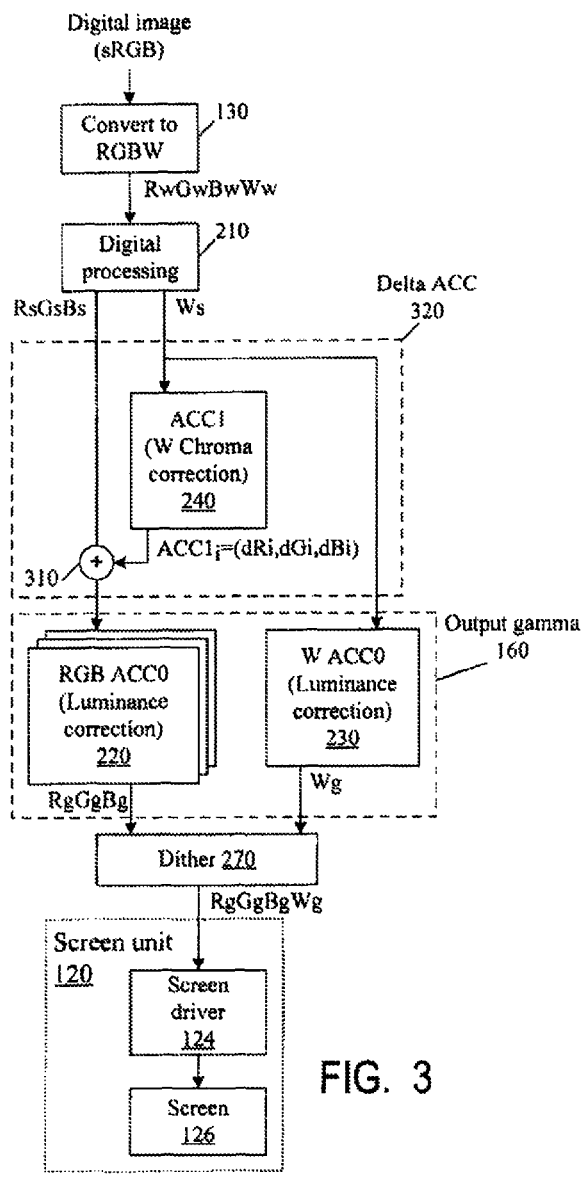

FIG. 3 shows an alternative embodiment which implements a "delta offset" color correction method. Here the ACC1 table 240 stores the $ACC1_i$ corrections (the "delta offsets", denoted (dRi, dRg, dBi) in FIG. 3), i.e. the corrections are in the linear color space. The $ACC1_i$ correction (dRi, dRg, dBi) is added to the respective linear RsGsBs coordinates generated by digital processing block 210. The addition is performed by adder 310. The adder's output is fed to the RGB ACC0 tables 220 constructed as in FIG. 2. The RgGgBg output of tables 220 is provided at the output of output gamma 160. The Wg grey values are generated by table 230 as in FIG. 2. The circuitry performing the linear color correction (i.e. the ACC1 table 240 and the adder 310) is shown as a separate block 320, but the invention is not limited to any particular division of circuitry into blocks.

In some embodiments, the table 240 generates also a correction to the white value Ws. Alternatively, a white-value correction can be generated from the RsGsBs coordinates.

It is conventional in some dark RGBW displays, or in RGBW displays used in unfavorable viewing conditions, to increase image brightness by increasing just the white sub-pixels' values. In such displays, for example, the white sub-pixel value Ws is multiplied by a "white gain" factor, and the result is hard-clamped to the allowable range of the Ws values. (As used herein, "hard-clamping" a value to a range of some numbers A to B means setting the value to the low bound A if the value is below A, and setting the value to the high bound B if the value is above B.) In FIGS. 2 and 3, the white gain adjustment can be done either before or after the white chrominance correction. For example, in FIG. 2, the Ws value can be adjusted before being provided to output gamma 160, or alternatively the white-gain adjustment can be performed on the Wg value output by W ACC0 table 230 or dither block 270. In FIG. 3, the white-gain adjustment can be performed on: (i) the output Ws of digital processing block 210; or (ii) the input Ws to W ACC0 table 230 but not on the input Ws of ACC1 table 240.

As stated before, the embodiments of FIGS. 2 and 3 can be used with SPR displays. If the display is non-SPR, then each pixel of the original image is associated with a quad of a red subpixel, a green subpixel, a blue subpixel, and a white subpixel. A chromaticity correction produced by ACC1 table 240 for a white subpixel is combined (by blocks 250, 260 in FIG. 2 or adder 310 in FIG. 3) with the subpixel values for the red, green and blue subpixels of the same quad.

Figure 4:
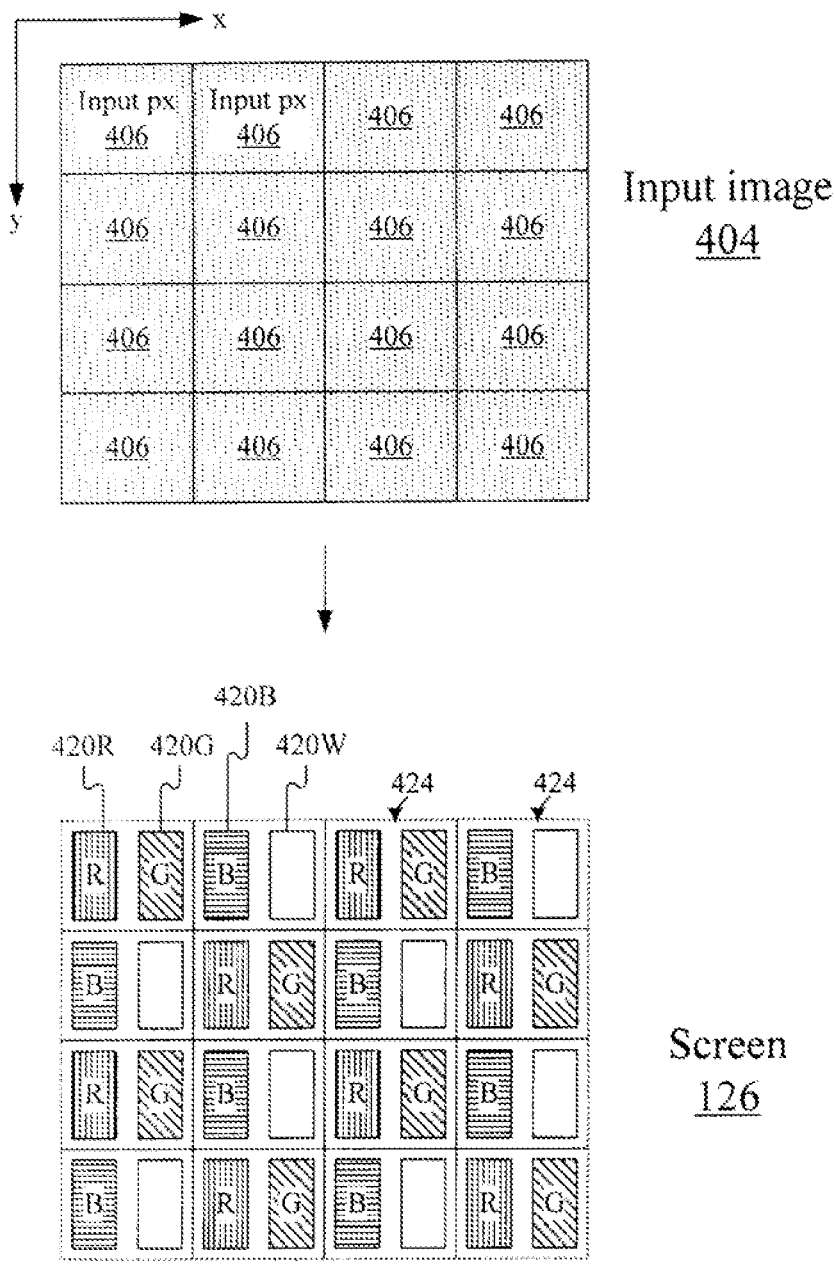
FIG. 4 illustrates a prior art mapping of an image consisting of pixels into a display with subpixels.

However, in some SPR displays, there may be no unique association between a white subpixel and red, green and blue subpixels. One such display is described in PCT application published as no. WO 2006/127555 A2 on 30 Nov. 2006 and U.S. patent application Ser. No. 11/278,675 published as no. 2006/0244686 A1 on 2 Nov. 2006 and illustrated in FIG. 4. In the example of FIG. 4, an image 404 is represented by a number of pixels 406. Each pixel 406 is mapped into a set of only two subpixels which are to display the pixel's color.

More particularly, screen 126 of this display contains red subpixels 420R, blue subpixels 420B, green subpixels 420G, and white subpixels 420W. All these subpixels 420 are equal in area. Each pixel 406 is mapped into a subpixel pair 424 consisting of two adjacent subpixels in the same row. Each pair 424 consists of either a red subpixel 420R and a green subpixel 420G (such pairs are called "RG pairs" below), or each pair consists of a blue subpixel 420B and a white subpixel 420W ("BW pair"). In each RG pair, the red subpixel is to the left of the green one. In each BW pair, the blue subpixel is on the left. The RG and BW pairs alternate in each row and each column. This is just an exemplary embodiment, and other subpixel arrangements are possible. For example, the red subpixel may be on the right in each RG pair, and the blue subpixel may be on the right in each BW pair. Also, the subpixels do not have to be equal in area. For example, in some displays, the white subpixel's area is adjusted to produce desirable ratios of RGB white to W white, and the white subpixel's area may be different from the area of a non-white subpixel. The red, green and blue subpixels may also have different areas.

Each pixel 406 in column x and row y of the image (pixel "$406_{x,y}$" below) is mapped into the subpixel pair 424 in column x and row y ("$424_{x,y}$" below). In screen 126, the consecutive indices x and y denote consecutive pairs, not consecutive subpixels. Each pair 424 has only two subpixels, and provides a high range and resolution in luminance but not in chrominance. Therefore, part of the input pixel's luminance may have to be shifted to adjacent pairs 424 in a subpixel rendering operation (SPR). Many subpixel rendering operations can be used. One example is as follows. Let the RGBW coordinates of pixel $406_{x,y}$ be denoted as $Rw_{x,y}$, $Gw_{x,y}$, $Bw_{x,y}$, $Ww_{x,y}$. Then, if a subpixel pair $424_{x,y}$ is not at the edge of the display, then the red subpixel's value Rs for the pair is computed as follows:

$$Rs = \tfrac{1}{2}*Rw_{x,y} + \tfrac{1}{8}*Rw_{x-1,y} + \tfrac{1}{8}*Rw_{x+1,y} + \tfrac{1}{8}*Rw_{x,y-1} + \tfrac{1}{8}*Rw_{x,y+1} \quad (8)$$

Similar computation can be used for the green, blue and white subpixels except at the edges. If a subpixel pair 424 is at an edge of the display, then the pixel values behind the display edge are needed, and they can be set to zero or some other values. See e.g. the United States Patent Publication No. 2005/0225563 having application Ser. No. 10/821,388 and entitled "IMPROVED SUBPIXEL RENDERING FILTERS FOR HIGH BRIGHTNESS SUBPIXEL LAYOUTS", incorporated herein by reference.

In FIGS. 2 and 3, the SPR operation can be performed by digital processing block 210, and the output RsGsBsWs of the SPR operation can be provided to output gamma 160 of FIG. 2 or Delta ACC circuit 320 of FIG. 3. Alternatively, before being provided to block 160 or 320, the RsGsBsWs output of the SPR operation can be subjected to other processing, e.g. sharpening, gamut clamping (gamut clamping is needed if the RsGsBsWs values are outside of the display gamut), or other types of processing.

In the ACC circuitry of FIGS. 2 and 3, the RGB coordinates obtained from ACC1 table 240 for a white subpixel 420W are combined (by blocks 260, 250 or adder 310) with the RGB coordinates of some adjacent subpixels 420R, 420G, 420B ("correction subpixels" below) which can be chosen in any desired manner. For example, in some embodiments, the blue subpixel 420B is taken from the same pair 424 as the white subpixel 420W, and the red and green subpixels 420R, 420G are taken from the pair 424 immediately to the left. If however the white subpixel 420W is in a pair 424 at the left edge of the screen, then the red and green corrections are not performed, and in some embodiments the blue correction is also not performed. Other choices of correction subpixels are also possible. In some embodiments, a single correction value (i.e. one of Rg1, Gg1, Bg1 of FIG. 2 or of dRi, dGi, dBi of FIG. 3) may be distributed to two or more subpixels 420 of the respective red, green or blue primary color.

Figure 5:
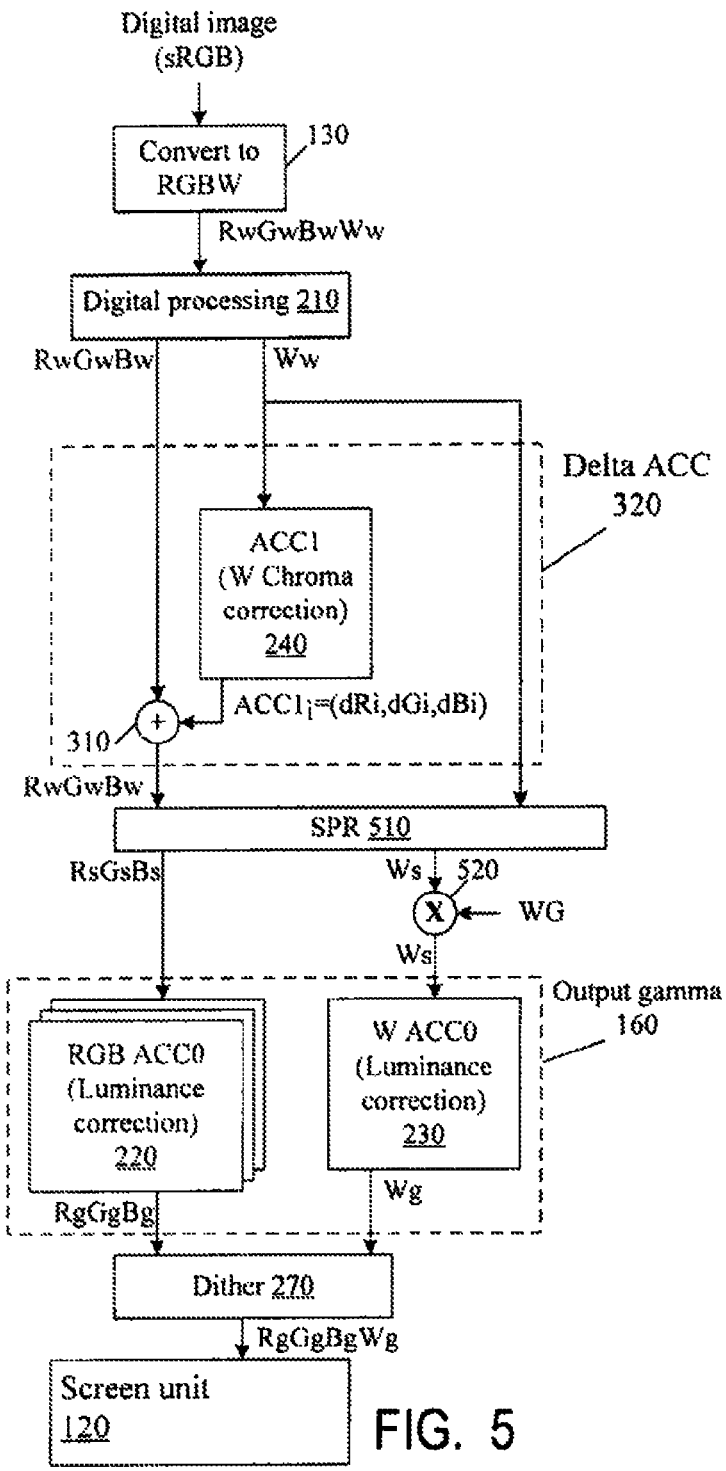
FIGS. 5-14 are block diagrams of displays according to some embodiments of the present invention.

In FIG. 5, the white chrominance correction is performed before the SPR. In this embodiment, digital processing 210 generates RwGwBwWw data, i.e. generates a data quad for each pixel 406. In delta ACC block 320, the Ww output of block 210 for each pixel 406 is provided to ACC1 table or circuit 240, which generates the appropriate RGB correction ACC1r(dRi, dGi, dBi) for the pixel. The correction is added to the RwGwBw coordinates for the pixel by adder 310. The sum, also denoted RwGwBw, is provided to SPR block 510 together with the Ww output of block 210. SPR block 510 performs subpixel rendering to generate the Rs, Gs, Bs, Ws subpixel values for the subpixels 420. Optionally, the Ws output of SPR block 510 is multiplied by the white gain factor WG. The multiplication is performed by multiplier 520. The subpixel data are provided to output gamma 160, which can be as in FIG. 3 for example. The subsequent processing can be as in FIG. 3.

Performing white chrominance correction before SPR as in FIG. 5 is advantageous because before SPR, the association between the Ww value and the Rw, Gw, Bw values is well defined by the pixels 406.

In some embodiments, ACC1 table 240 for the embodiment of FIG. 5 is generated as follows. Some ideal white color DD is chosen, possibly as described above in connection with FIGS. 2 and 3. The white color measurements $WXYZ_i$ are performed for each grey value Wg=i (e.g. i=0, 1, ..., 255 in case of 8-bit grey values), with Rg=Gg=Bg=0. For each value Ww, the output of ACC1 table 240 is determined as the difference between the ideal color DD*Ww/max{Ww} and a measured color WXYZi, where the measured color WXYZi is chosen as the measurement whose luminance (e.g. the CIE Y coordinate) is the closest to the luminance of Ww. The vector difference is expressed in the linear RGB coordinates using the matrix $R2X^{-1}$ described above.

In some embodiments, ACC1 table 240 is constructed as follows. A number of measurements are performed to obtain CIE xyY coordinates. In each measurement, one of the primaries' grey values is positive and the remaining grey values are zero (as in step 1 discussed above for the embodiment of FIG. 2). For each primary, for each of the x, y, and Y coordinates, the measurements are smoothened by a box filter. Also, for each primary, the Y measurements are normalized by subtracting the smallest Y value and dividing the results by a suitable factor so that the normalized Y values add up to 1.

Let mx denote the number of measurements performed for each primary. For ease of discussion, it will be assumed that the grey values are 8-bit wide, and mx=256 measurements are performed for each primary. If i is a grey value, then let us denote the smoothed and normalized values as for the red primary as $Rx_i$, $Ry_i$, $RY_i$, and use similar notation for the other primaries.

Then the smoothed and normalized values for the brightest primaries (i.e. for the grey values of 255) are used to obtain conversion matrices between the RGBW color space tied to the brightest measured primaries and the CIE YXZ color space. More particularly, the following matrix is defined:

$$p = \begin{Vmatrix} Rx_{mx} & Gx_{mx} & Bx_{mx} & Wx_{mx} \\ Ry_{mx} & Gy_{mx} & By_{mx} & Wy_{mx} \\ 1-Rx_{mx}-Ry_{mx} & 1-Gx_{mx}-Gy_{mx} & 1-Bx_{mx}-By_{mx} & 1-Wx_{mx}-Wy_{mx} \end{Vmatrix}$$

Then each element of p is multiplied by the corresponding Y/y value (where Y is normalized and y is smoothed). The resulting matrix, denoted M2X below, provides conversion from RGBW to XYZ. The first three columns of M2X form a matrix, denoted by R2X, that converts from RGB to XYZ where RGB is the linear color space defined by the brightest red, green and blue primaries of the display. Both R2X and M2X are "normalized" in the sense that the brightest primaries are converted to a representation whose Y values are normalized.

Ideally, the x and γ values of each primary should be independent of the primary's grey value i. This is not however the case for some displays as discussed above.

The measurements $Rx_i$, $Ry_i$, $RY_i$, etc. are then "re-sampled" to make them more evenly spaced in a linear color space. More particularly, the grey values i are non-linear with respect to luminance, so the grey values are not evenly spaced in a linear space. The re-sampling procedure assumes the power law (1) with γ=2.2. Let us introduce a variable j that takes values in a linear space. The j values are such that each value i corresponds to $j=(i/255)^{2.2}$*MAXCOL where MAXCOL is the maximum j value (in some embodiments, MAXCOL is the maximum of each of Rw, Gw, Bw, Ww values output by digital processing circuit 210 and conversion circuit 130. In some embodiments, MAXOL=2047. The measurements described above provide the xyY coordinates for the j values of about $(i/255)^{2.2}$*MAXCOL, and these values are not evenly spaced. Therefore, the xyY coordinates for evenly spaced j values j=0, 1, 2, . . . MAXCOL are interpolated from the smoothed and normalized xyY measurements for the unevenly spaced j values using cubic spline interpolation. The re-sampled values are converted to the XYZ color space. Let us denote the XYZ values of the red, green, blue and white primaries as $RXYZd_j$, $GXYZd_j$, $BXYZd_j$, and $WXYZd_j$ respectively.

The ideal white color DD can be chosen in many ways. One possibility is to choose a color identical in chromaticity to the brightest color displayed when all the grey values are at the maximum of mx (i.e. 255). This color DD is:

$$DRGBW = M2X \cdot \begin{Vmatrix} 1 \\ 1 \\ 1 \\ 1 \end{Vmatrix}$$

Another possibility is to choose a color identical in chromaticity to the brightest color displayed when the white grey values Wg=mx and the remaining grey values are all zeros. This color DD is:

$$DW = M2X \cdot \begin{Vmatrix} 0 \\ 0 \\ 0 \\ 1 \end{Vmatrix}$$

In any case, the DD color is multiplied by j/MAXCOL to obtain ideal white colors (grey colors) for different j, where MAXCOL is the maximum j value.

The resulting colors DD*j/MAXCOL are converted into the RGB space by applying the matrix $R2X^{-1}$. Let us denote the resulting ideal "ramp" as $IRGB_j$ (Ideal RGB).

If DD=DRGBW, then the re-sampled RGBW data are summed up for each j to compute $RGBWXYZ_j=RXYZd_j+GXYZd_j+BXYZd_j+WXYZd_j$, and these sums are converted to RGB using the $R2X^{-1}$ matrix. Let us denote the resulting values as $RGBRGBW_j$. ACC table 240 is written with the difference $IRGB_j-RGBRGBW_j$. Each difference includes the red, green and blue components provided by table 240 in response to Ww=j.

If DD=DW, then the re-sampled W data are converted to RGB using the $R2X^{-1}$ matrix. Let us denote the resulting values as $WRGB_j$. ACC table 240 is written with the differences $IRGB_j-WRGB_j$. Each difference includes the red, green and blue components provided by table 240 in response to Ww=j.

In either case (DD=DRGBW or DD=DW), in some embodiments, the blue components in table 240 are hard-clamped to the maximum value of zero, i.e. the blue corrections are prevented from being positive.

METAMER ADJUSTMENT. White chrominance correction involves adding positive or negative numbers output by table 240 to red, green and blue values, and the resulting colors may be out-of-gamut (e.g. if the addition causes overflow or underflow). The out-of-gamut colors can be brought inside gamut by a suitable gamut clamping operation, but gamut clamping may lead to image distortion. Image distortion can be reduced by selecting a suitable RGBW representation in block 130 or 320 since color representation in RGBW coordinates is typically not unique. For example, if Rw, Gw, or Bw coordinate overflows, the RwGwBw coordinates may be reduced via increasing Ww. In case of underflow, the RwGwBw coordinates may be increased via reducing Ww.

Different RGBW representations of a color are called "metamers" in some literature and herein. (Other literature uses the word "metamers" to denote electromagnetic waves of different spectral power distributions perceived as the same color, but different RGBW representations do not necessarily mean different spectral power distributions.)

Figure 6:
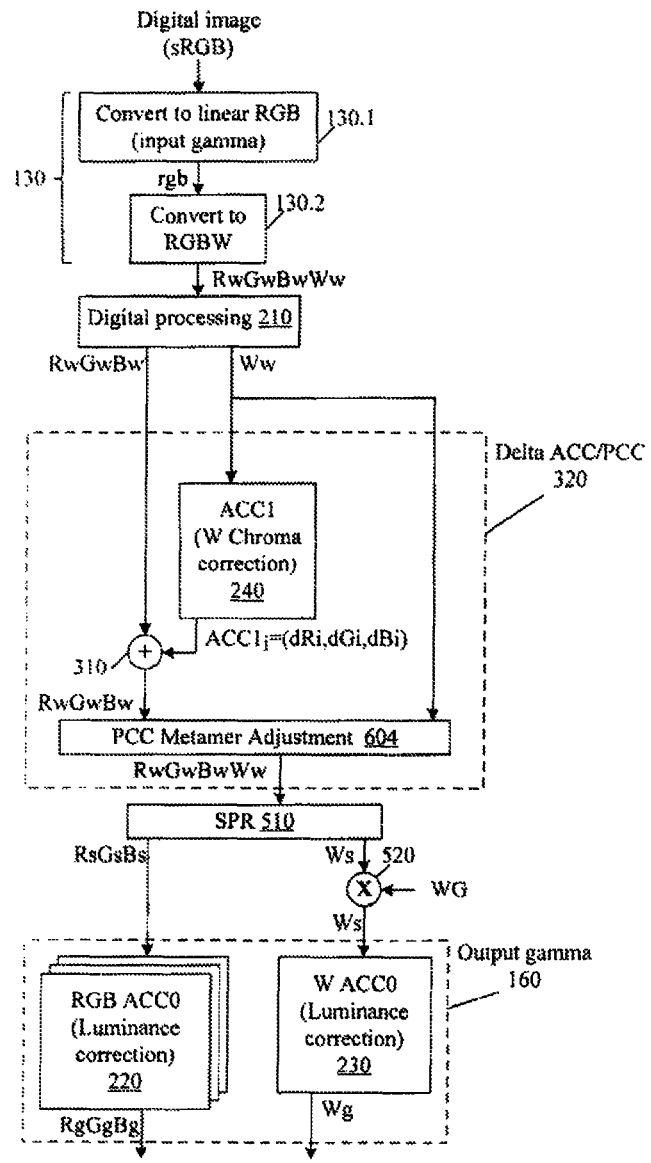

FIG. 6 shows an embodiment similar to FIG. 5 but with block 320 containing a metamer correction circuit 604 ("post-color correction" or PCC) at the output of adder 310. Table 240 can be constructed as in FIG. 5. SPR block 510 may or may not be present (i.e. the embodiment is suitable for both SPR and non-SPR displays).

FIG. 6 represents RGBW conversion block 130 as two blocks 130.1, 130.2. Block 130.1 converts sRGB data to a linear RGB color space. This color space may be independent of the display, or may have primary colors having the same chromaticity as the red, green and blue emitters of screen unit 120. Block 130.1 is sometimes referred to as "input gamma" In some embodiments, all processing between input gamma 130.1 and output gamma 160 is performed in linear coordinates (RwGwBwWw and RsGsBsWs are linear representations of color).

Block 130.2 converts the linear RGB data (denoted r, g, b) to RGBW data (denoted Rw, Gw, Bw, Ww) using a well know method. In some embodiments, $$r = M_0 \cdot Rw + M_1 \cdot Ww$$

$$g = M_0 \cdot Gw + M_1 \cdot Ww$$

$$b = M_0 \cdot Bw + M_1 \cdot Ww \quad (9)$$

where $M_0$ and $M_1$ are constants corresponding to the luminance characteristics of pixels 420 as follows:

$$M_0 = (Y_r + Y_g + Y_b)/(Y_r + Y_g + Y_b + Y_w)$$

$$M_1 = Y_w/(Y_r + Y_g + Y_b + Y_w) \quad (10)$$

where $Y_r, Y_g, Y_b, Y_w$ are defined as follows. $Y_r$ is the luminance of display 110 when the red subpixels 420R are maximally emissive and all the remaining subpixels are minimally emissive. The values $Y_g$, $Y_b$, $Y_w$ are defined in a similar manner for the green, blue, and white subpixels.

If the Ww coordinate is known, then Rw, Gw, and Bw can be computed from (9).

In some embodiments, each of the r, g, b, Rw, Gw, Bw, Ww is an integer allowed to vary from 0 to some maximum number MAXCOL inclusive. For example, in some embodiments, MAXCOL=2047.

The equations (9) clearly require that if r, g, or b is zero, then Ww must be zero. If r=g=b=MAXCOL, then Ww=MAXCOL. However, for many colors, Ww can be chosen in a number of ways (to define one or a number of metamers). In order for each of Rw, Gw, Bw, Ww to be in the range of 0 to MAXCOL inclusive, Ww must be in the following range:

$$minW \le W \le maxW \quad (11)$$

where $$minW = [max(r, g, b) - M_0 * MAXCOL]/M_1$$

$$maxW = min(r, g, b)/M_1$$

Table 1 below illustrates pseudocode which can be used as simulation code for one embodiment of the ACC/PCC block 320 of FIG. 6. The simulation code is written in the well known programming language LUA. This language is similar to C.

At line ACC7 of Table 1, the values Rw, Gw, Bw, Ww are fetched for the pixel 406 being processed. At line ACC9, the Ww value is multiplied by the white gain factor. The resulting white-gain-corrected value is shown as Wg, and this should not be confused with the grey value Wg mentioned elsewhere. At lines ACC10-ACC12, the white-gain-corrected value Wg is supplied to ACC1 table 240. The resulting values dRi, dGi, dBi are shown respectively as Dr, Dg, Db. At lines ACC13-ACC16, adder 310 performs the addition to generate the sums R_pcc, G_pcc, B_pcc. The white value W_pcc in line ACC16 is simply the original value Ww. The values R_pcc, G_pcc, B_pcc, W_pcc are then metamer adjusted by circuit 604 as shown in lines ACC24-ACC36.

More particularly, it is first determined if any of R_pcc, G_pcc, B_pcc is negative. The minimum of these three values is shown as minRGB_pcc in line ACC24. If this minimum is negative, then a positive adjustment needs to be made, i.e. a positive number pos_adj_pcc should be added to R_pcc, G_pcc, and B_pcc. If the minimum is not negative, then pos_adj_pcc is set to zero. See lines ACC24-ACC28.

The white coordinate W_pcc should be reduced by an amount W_adj_pcc corresponding to pos_adj_pcc. If $M_0 = M_1 = \frac{1}{2}$, then W_adj_pcc=pos_adj_pcc. More generally, as seen from equations (9), W_adj_pcc=$M_0$/$M_1$*pos_adj_pcc. The value $M_1/M_0$ is often denoted as $M_2$.

However, the white coordinate W_pcc (i.e. Ww) should not be reduced to a value below zero. Therefore, in line ACC31, the decrement value W_adj_pcc is hard-clamped to its maximum possible value, i.e. to Ww. In line ACC32, the adjusted increment RGB_adj_pcc for the red, green and blue coordinates is computed from W_adj_pcc. In lines ACC33-ACC36, the metamer adjustment is performed by incrementing R_pcc, G_pcc, B_pcc with RGB_adj_pcc and decrementing W_pcc. In lines ACC39-ACC43, the new values R_pcc, G_pcc, B_pcc W_pcc are hard-clamped to the maximum value MAXCOL.

TABLE 1

Delta ACC/PCC block 320

```
ACC1.--*******************************************
ACC2.          --Delta ACC and Metamer Adjustment: do it
              after Post Scale and before SPR
ACC3. if ACCmode==4 then
ACC4.     next="sacc"
ACC5.     spr.create(next,xsiz,ysiz,6,2)
ACC6.     spr.loop(xsiz,ysiz,1,1,function(x,y)
ACC7.        local Rw,Gw,Bw,Ww,Lw,Ow=spr.fetch(pipeline,x,y)
ACC8.             --white gain moves from end of SPR to here
              when ACCmode==4
ACC9.        Wg = math.floor(Ww*(WG+1)/256)      --white gain
              can decrease white here
ACC10.       local Dr = accRdel[Wg]    --RGB delta values
              are fetched
ACC11.          local Dg = accGdel[Wg]
ACC12.          local Db = accBdel[Wg]
ACC13.          R_pcc = Rw+Dr             --the delta
              values are added to the linear RGB values
ACC14.          G_pcc = Gw+Dg
ACC15.          B_pcc = Bw+Db
ACC16.          W_pcc = Ww
ACC17.
ACC18.
ACC19.       -- After the adding the delta ACC data, the blue
              value may go negative
ACC20.       -- Instead of forcing the blue value to zero, add
              some RGB component and subtract W to adjust the metamer
              without clipping
ACC21.       PCC_ADJ = PCC_ADJ or  0 -- (OPTIONAL)
              POST-COLOR-CORRECTION METAMER ADJUST
ACC22.
ACC23.          if PCC_ADJ == 1 then
ACC24.            minRGB_pcc = math.min(R_pcc, G_pcc, B_pcc)
ACC25.            if minRGB_pcc < 0 then
ACC26.              pos_adj_pcc = -minRGB_pcc -- reverse
              the negative sign and store it as a positive adjustment
ACC27.            else
ACC28.              pos_adj_pcc = 0
ACC29.            end
ACC30.            W_adj_pcc   = math.floor(M2_inv/32 *
              pos_adj_pcc)
ACC31.            W_adj_pcc   = math.min (Ww, W_adj_pcc)
              -- positive RGB adjustment is ultimately limited by the
              amount of W available
ACC32.            RGB_adj_pcc = math.floor(M2_reg/256 *
              W_adj_pcc)
ACC33.            R_pcc = R_pcc    + RGB_adj_pcc -- push up the
              RGB component so that post color corrected metamer
              isn't negative
ACC34.            G_pcc = G_pcc + RGB_adj_pcc   --
ACC35.            B_pcc = B_pcc + RGB_adj_pcc
ACC36. W_pcc = Ww − W_adj_pcc
ACC37.          end
ACC38.
```

TABLE 1-continued

Delta ACC/PCC block 320

ACC39.   Rw = math.max(0,math.min(MAXCOL,R_pcc)) --
         they are clamped inside the pipeline range
ACC40.   Gw = math.max(0,math.min(MAXCOL,G_pcc))
ACC41.   Bw = math.max(0,math.min(MAXCOL,B_pcc))
ACC42.   Ww = math.max(0,math.min(MAXCOL,W_pcc))
ACC43.   spr.store(next,x,y,Rw,Gw,Bw,Ww,Lw,Ow)
END OF TABLE 1

The embodiment of Table 1 uses a hard clamp to correct for overflow (lines ACC39-ACC42), but in other embodiments an overflow is corrected similarly to the underflow. More particularly, if there is an overflow but no underflow, then the maximum overflow in coordinates Rw, Gw, Bw output by table 240 can be determined, and the corresponding Ww increment can be determined to reduce or eliminate the maximum overflow.

The embodiments described above can be used with or without SPR and with or without DBLC. Some embodiments will now be described that are useful for displays with DBLC.

Figure 7:
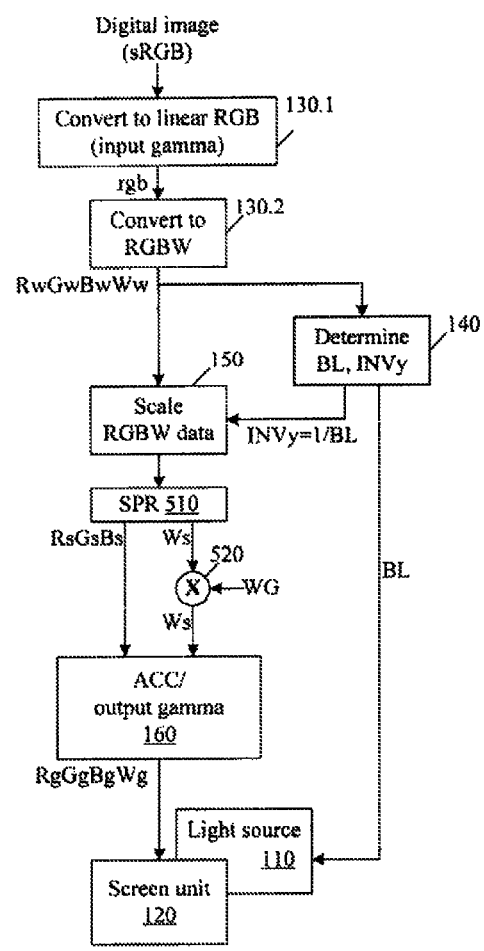

FIG. 7 shows an LCD DBLC embodiment in which SPR 510 is performed before ACC. The ACC1 correction is performed in output gamma block 160 as in FIG. 2, but can be performed in before output gamma 160 as in block 320 of FIG. 3, 5, or 6 (if ACC is performed as in FIG. 5 or 6, then ACC can be performed before SPR 510). DBLC block 140 and scaler 150 may operate as in FIG. 1. SPR 510 is performed on the output of scaler 150.

As described above, the ACC correction may interfere with DBLC because the factors BL, INVy are computed based on pre-ACC data. The embodiment of FIG. 8 addresses this problem as described below. This embodiment is suitable for both SPR and non-SPR displays; SPR can be performed before or after ACC/PCC block 320; block 320 can be as in FIG. 6, or can skip the metamer adjustment as in FIG. 3 or 5.

Figure 1:
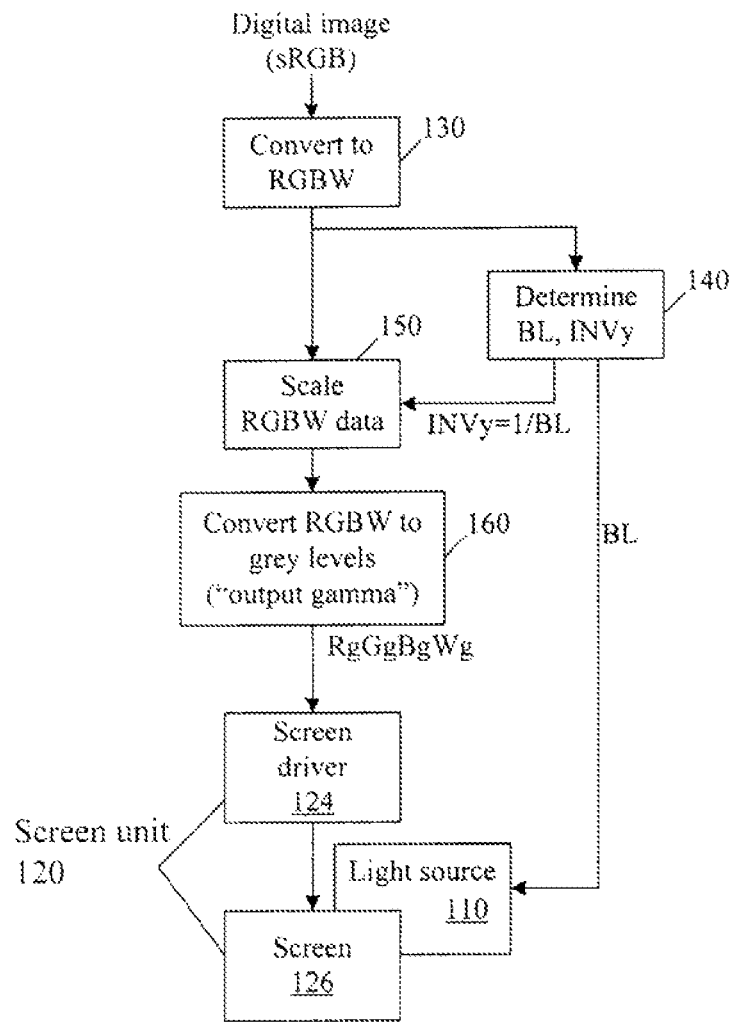
FIG. 1 is a block diagram of a display according to prior art.

Referring first to FIG. 1, it is conventional to delay the BL and INVy values by one frame. More particularly, the INVy value determined from the sRGB data for one frame ("current frame") can be used by scaler 150 for scaling the next frame. The BL value determined from the current frame can be used to control light source 110 when screen unit 120 displays the next frame. The current frame is scaled and displayed using the BL and INVy values determined from the previous frame of data. Let "k" denote a frame number, and $BL_k$ and $INV_k$ denote the BL and INVy values computed from the data for frame k. Then the values $BL_k$ and $INV_k$ are used to scale and display the next frame k+1. This one-frame delay allows one to start displaying the current frame k before the values $BL_k$ and $INVy_k$ have been determined. In fact, displaying the current frame may begin even before all the sRGB data for the current frame have been received. To reduce image errors, the BL values can be "decayed", i.e. the $BL_k$ value can be generated by block 430 as a weighted average of the BL value determined from the data for the current frame and the previous BL value $BL_{k-1}$. In this case, the inverse values INVy will also be decayed. In some displays which display 30 frames per second, when the image brightness abruptly changes, it may take about 36 frames for the BL and INVy values to catch up with the image brightness. This delay is acceptable in many applications. Indeed, in the absence of abrupt changes of the image brightness, the BL and INVy values typically do not change much from frame to frame, and a one-frame delay does not cause significant degradation of the image. When abrupt changes of brightness do occur, it takes time for the viewer to visually adjust to the image, so image errors due to the delay of the BL and INVy values do not stand out. See also U.S. patent application published as US 2009/0102783 A1 on Apr. 23, 2009, filed by Hwang et al., incorporated herein by reference.

Figure 8:
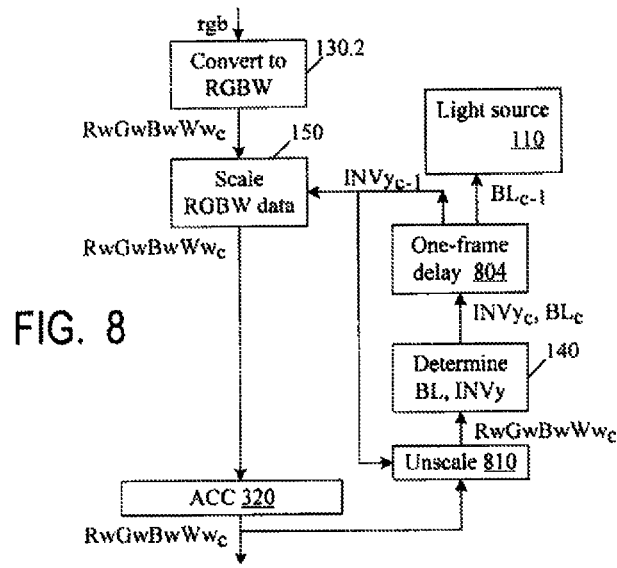

In FIG. 8, the one-frame delay is shown as block 804.

In some embodiments of the present invention, the delay is exploited to determine the BL and INVy values from the ACC-corrected data for the previous frame rather than the uncorrected data.

In the example of FIG. 8, the subscript "c" indicates the current frame. The RwGwBwWw data for the current frame are denoted $RwGwBwWw_c$.

Scaler 150 scales the current frame's data $RwGwBwWw_c$ with the $INVy_{c-1}$ parameter determined from the previous frame. ACC block 320 performs ACC correction and PCC metamer adjustment on the scaler's output $RwGwBwWw_c$ for the current frame as described above in connection with FIG. 3, 5, or 6, possibly as in Table 1. The $RwGwBwWw_c$ output of ACC block 320 can be processed as described above (e.g. by SPR block 510 in SPR displays, by output gamma 160, and possibly in other manner) for display on screen 126.

The $RwGwBwWw_c$ output of ACC/PCC block 320 is also provided to un-scale block 810 for "un-scaling". The un-scaling can be performed by dividing the $RwGwBwWw_c$ data by the $INVy_{c-1}$ parameter determined from the previous frame (or, equivalently, by multiplying the $RwGwBwWw_c$ data by the $BL_{c-1}$ parameter determined from the previous frame).

DBLC block 140 uses the $RwGwBwWw_c$ data from un-scale block 810 to determine the $BL_c$ and $INVy_c$ parameters, possibly in a conventional manner. These parameters are provided to scaler 150 and light source 110 for use with the next frame "c+1".

In some embodiments, the un-scaling is performed on the BL and INVy parameters rather than on RwGwBwWw. More particularly, un-scaling block 810 is omitted. DBLC block 140 scales the thresholds (such as MAXCOL) by multiplying the thresholds by $INVy_{c-1}$, and uses the scaled thresholds to determine the $BL_c$ and $INVy_c$ values for the current frame from the un-scaled output $RwGwBwWw_c$ of ACC/PCC block 320. These values $BL_c$ and $INVy_c$ are then "un-scaled", i.e. divided by the $INVy_{c-1}$ (or, equivalently, multiplied by $BL_{c-1}$).

Figure 9:
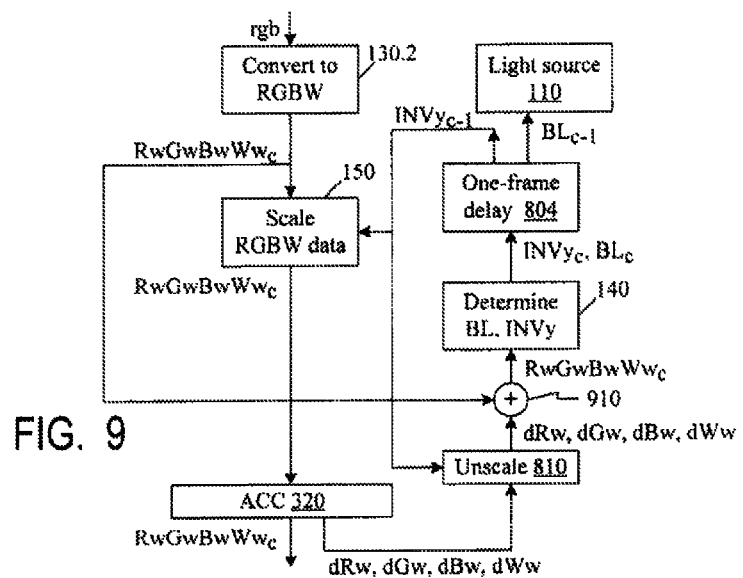

FIG. 9 shows an embodiment similar to FIG. 8, but the un-scaling 810 is performed not on the RGBW data but rather on the difference dRw, dGw, dBw, dWw between the RwGwBwWw data output by ACC 320 and the RwGwBwWw data output by circuit 130.2. The difference data dRwdGwdBwdWw are smaller in size, and may need fewer bits and logic gates for the un-scaling. Adder 910 sums the un-scaled difference data dRwdGwdBwdWw with the RwGwBwWw output of block 130.2, and the sum is provided to DBLC block 140. The remaining processing is as described above in connection with FIG. 8.

Of note, if ACC block 320 is as in FIG. 5, then (dRw, dGw, dBw) are identical to (dRi, dGi, dBi). In some embodiments, ACC block 320 is as in FIG. 6 (with metamer adjustment 604), but (dRw, dGw, dBw) are still set to (dRi, dGi, dBi) to reduce the gate count.

The embodiments of FIGS. 8 and 9 are suitable for RGB displays. For example, ACC 320 may perform luminance correction for the RGB data. The luminance correction may be accomplished, for example, by tables similar to ACC0 tables 220 (FIG. 2). In some embodiments, the corrected RGB luminance is in a linear color space, i.e. the output of ACC 320 can be linear RGB coordinates RwGwBw. The invention is not limited to RGB or any other set of primary colors except as defined by the appended claims.

Now possible metamer adjustments before scaling will be described. In LCDs, to provide high image quality with minimum output power BL, the RwGwBwWw coordinates of each pixel 406 should preferably be close to each other. In some embodiments, in block 130.2, Ww is set to max(r, g, b), or to the average of r, g and b, or in some other way. See for example the aforementioned U.S. patent application 2006/0244686 filed by Higgins et al. However, the ACC adjustments may frustrate the goal of minimizing the output power BL or whatever other goals may have been pursued by the metamer choice in conversion block 130.2. Therefore, in some embodiments, RGBW conversion 130.2 is followed by further ACC-related metamer adjustment ACCMET 1010 (FIG. 10) which adjusts the metamers based on the anticipated ACC operation. For example, a metamer may be adjusted so that after the ACC the RwGwBwWw coordinates will be close to each other.

Of note, equations (9) may require the values Rw, Gw, Bw to exceed MAXCOL and be as high as MAXCOL/$M_0$. For example, if b=0, then Ww=0; if r=g=MAXCOL, then Rw=Gw=MAXCOL/$M_0$. For the sake of illustration, we will assume that $M_0=M_1=\frac{1}{2}$, i.e. the white subpixels are as bright as the red, green and blue subpixels. In this case, the Rw, Gw, and Bw values can be as high as 2*MAXCOL. The screen unit 120 accepts only colors whose linear RwGwBwWw coordinates do not exceed MAXCOL. To display the other colors, the backlight unit's power can be increased by a multiplicative factor BL up to 1/$M_0$ (e.g. doubled). In this case, the RwGwBwWw coordinates should be multiplied by INVy=1/BL. This multiplication should reduce the RwGwBwWw coordinates to the allowable range of 0 to MAXCOL inclusive. The maximum INVy value $INVy_{max}$ required to force the RwGwBwWw coordinates into the allowable range determines the minimum BL value $BL_{min}$. However, to save power, some embodiments do not increase the backlight unit's power or they increase the backlight unit's power by a multiple smaller than $BL_{min}$. Therefore, the RwGwBwWw data multiplied by INVy=1/BL may include coordinates outside the allowable range, and therefore scaler 150 may perform some gamut clamping to force the RwGwBwWw coordinates into the allowable range. Suitable gamut clamping techniques include hard clamping and other known techniques. See for example U.S. patent application published as no. 2007/0279372 A1 published on Dec. 6, 2007, filed by Brown Elliott et al., entitled "MULTIPRIMARY COLOR DISPLAY WIITH DYNAMIC GAMUT MAPPING", incorporated herein by reference.

Figure 10:
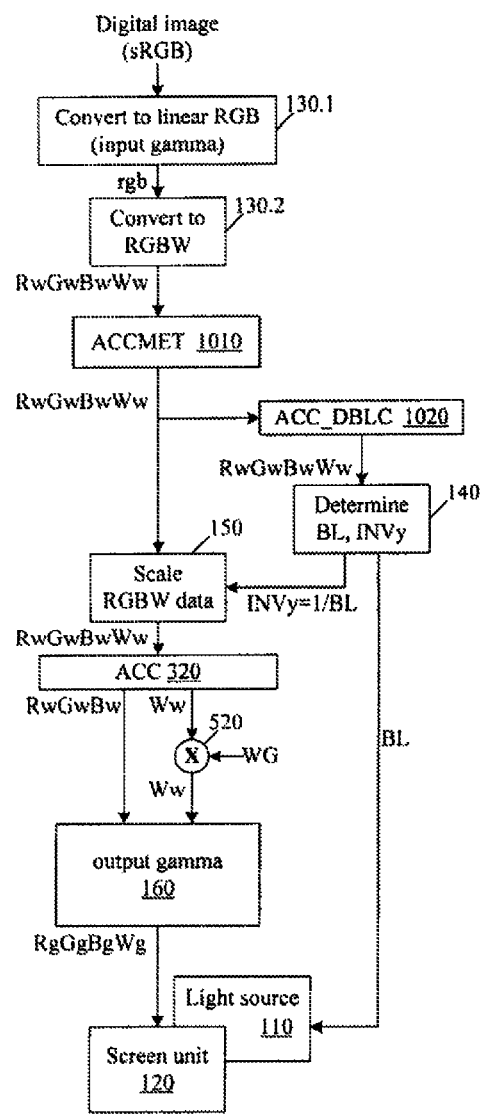

FIG. 10 illustrates one non-SPR embodiment in which the output of block 130.2 is provided to metamer adjustment circuit 1010 which adjusts the RwGwBwWw values as appropriate for the subsequent ACC operation in block 320. In some embodiments, ACCMET 1010 reduces image distortion in gamut clamping. The RwGwBwWw values adjusted by ACCMET 1010 are provided to scaler 150. The scaler output RwGwBwWw is provided to ACC block 320. ACC block 320 may be as in FIG. 3, 5, or 6. The Ww output of ACC 320 may be multiplied by white gain WG using multiplier 520. Since no SPR is used, the pixel values Rw, Gw, Bw, Ww act as the subpixel values Rs, Gs, Bs, Ws, and are provided to output gamma 160.

DBLC 140 is coordinated with the white chrominance correction because the color correction performed by ACC 320 may change the peak subpixel values Rw, Gw, Bw, Ww and hence may affect the appropriate setting of the backlight unit's output power (specified by the BL parameter). More particularly, the output of ACCMET 1010 is provided to ACC_DBLC circuit 1020. ACC_DBLC 1020 performs a function similar to the ACC function of block 320 to estimate the ACC white chrominance correction. The estimate is taken into account by DBLC 140 in generating the BL and INVy values. One-frame delay may or may not be used, i.e. the BL and INVy values generated from the current frame may be used for the current frame or for the next frame or for some subsequent frame.

Figure 11:
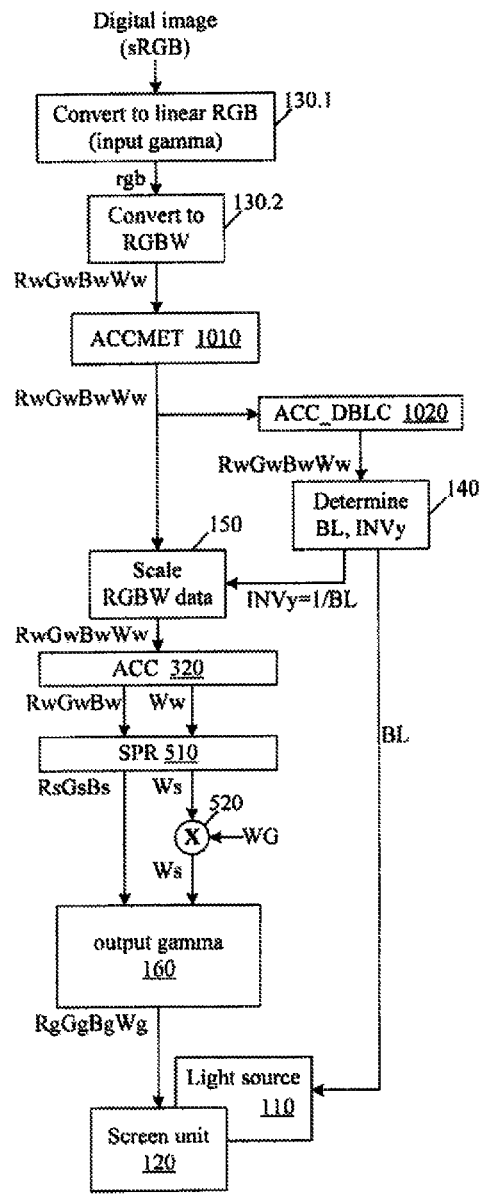

FIG. 11 is identical to FIG. 10 except for the addition of SPR block 510 at the output of ACC 320. The white gain adjustment by multiplier 520 is performed on the Ws output of SPR 510. Output gamma 160 can be as in FIG. 3 or 5 for example. ACC 320 can be as described above in connection with FIG. 3, 5 or 6.

In some embodiments, ACCMET 1010 is omitted, but ACC_DBLC 1020 is present. In other embodiments, ACC_DBLC 1020 is omitted by ACCMET 1010 is present. In some embodiments, the functions of ACCMET 1010 and ACC_DBLC 1020 are combined in circuitry and are not clearly separable.

Figure 12:
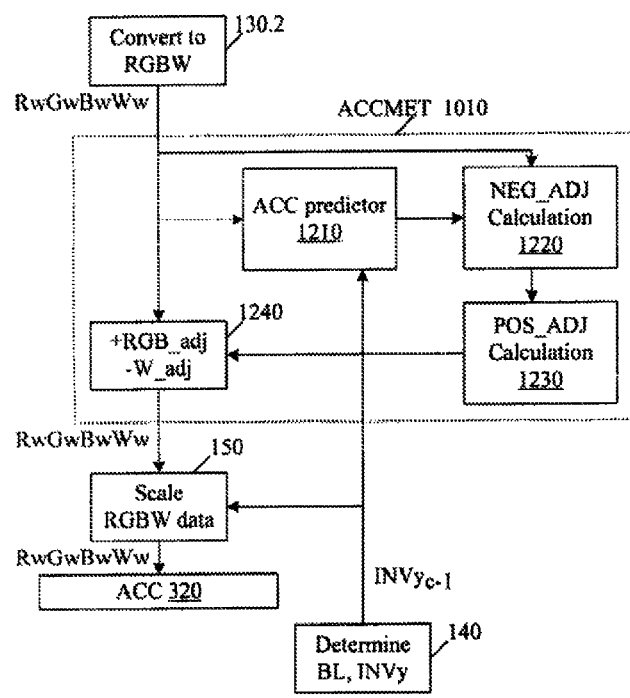

FIG. 12 shows one embodiment of ACCMET 1010. Table 2 below illustrates pseudocode which can be used as simulation code for one embodiment of the ACC block 320 of FIG. 5. The simulation code is written in LUA.

The RGBW output of conversion block 130.2 is provided to Delta ACC Predictor 1210. ACC Predictor 1210 (lines ACM1-ACM27 in Table 2) predicts the white chrominance correction which will be performed by ACC 320. The prediction is not always completely accurate but may be an approximate estimate. For example, the predictor may use a table similar to ACC1 table 240 of FIG. 5 or 6, but with fewer bits for each entry to reduce the circuit size. Further, since ACCMET 1010 may change the white coordinate Ww, the corresponding chrominance correction computed based on the changed coordinate may be different from the predicted correction computed based on the Ww value input to ACCMET 1010.

In the embodiment of lines ACM3-ACM14, the predicted values are 7 bits wide, even though the RwGwBwWw coordinates are 12 or 14 bits wide. The predicted white value W_predict is a scaled value obtained as the product of Ww with the white gain factor (line ACM5) and with the INVy value $INVy_{c-1}$ for the previous frame (line ACM6). The value $INVy_{c-1}$ is used by scaler 150 to scale the data for the current frame. (Of note, the white gain factor and the predicted values are expressed as integers equal to 256 times their actual values, so division by 256 is performed when needed.) The resulting W_predict value is clamped to the maximum 7-bit value of 127 (line ACM7) and is provided to an ACC table similar to ACC1 table 240 but with fewer bits. In Table 2, the ACC1 table 240 is shown as three tables accRmini, accGmini, accBmini (lines ACM8-ACM10). These tables provide the red, green and blue correction values Dr, Dg, Db. These values are divided by INVy (lines ACM11-ACM13) to undo the scaling, because the metamer adjustment will be performed on the un-scaled RwGwBwWw values output by block 130.2.

Lines ACM16-ACM26 show another option for calculating Dr, Dg, Db. In this option, the predicted values are as wide as the RwGwBwWw values (i.e. 12 or 14 bits). The W-predict value is clamped to MAXCOL rather than being truncated to 7 bits. Tables accRdel, accGdel, accBdel are used instead of accRmini, accGmini, accBmini. In other respects, this option is similar to the option of lines ACM3-ACM14.

After calculation of Dr, Dg, Db by block 1210, metamer adjustments are made consistent with the goal of metamer selection. In the example of Table 2, the goal is assumed to reduce the output power of backlight source 110. To achieve this goal, the maximum Ws value for each white subpixel should be about equal to the maximum of the Rs, Gs, Bs values for the adjacent red, green and blue subpixels. In the embodiment of Table 2, an attempt is made to force the ACC-adjusted Ww value for the pixel being processed to be about equal to the Rw, Gw, Bw values for the pixel. It is assumed that in conversion block 130.2, the Ww value was determined as maximum of Rw, Gw, Bw values for the pixel. To gain some intuitive understanding, let us assume that $M_0=M_1=\frac{1}{2}$, Rw=Gw=Bw=Ww, and Dr=Dg=Db, and in the absence of ACCMET 1010 the ACC block 320 would increment Rw, Gw, Bw by a value D which is the common value of Dr, Dg, and Db. Then to make Rw=Gw=Bw=Ww at the output of ACC block 320, ACCMET 1010 should decrement Rw, Gw, Bw by D/2, and should increment Ww by D/2.

The D/2 value is first determined in "negative adjustment" block 1220 as shown in lines ACM34-ACM45 (despite the "negative adjustment" name, D/2 can be either positive or negative). The negative of the value D/2 is labeled "neg_adj" in Table 2. More particularly, as shown in lines ACM35-ACM37, the predicted corrected values R_corr, G_corr, B_corr are calculated as the sum of Rw, Gw, Bw and the respective predicted corrections Dr, Dg, Db (the corrections can be either positive or negative). The maximum of R_corr, G_corr, B_corr is determined in line ACM39. If the maximum equals the red corrected value, then neg_adj is set to –Dr/2. If the maximum is not equal to the red corrected value but is equal to the green corrected value, then neg_adj is set to –Dg/2. If the maximum is not equal to the red or green corrected values but is equal to the blue corrected value, then neg_adj is set to –Db/2. The negative adjustment neg_adj is then added to Rw, Gw, Bw (lines ACM55-ACM58). The sum is denoted as R_low, G_low, B_low. This sum could be the RGB coordinates of the new metamer unless the sum includes a negative component or the Ww adjustment would lead to overflow or underflow.

The total value to be added to Rw, Gw, Bw output of block 130.2 is denoted as RGB_adj (line ACM83), and will be added to Rw, Gw, Bw in lines ACM92-ACM94, and then hard-clamped to zero in lines ACM97-ACM99. The result will be the RGB coordinates of the new metamer.

RGB_adj is the sum of three values: neg_adj calculated by circuit 1220 as described above, pos_adj1, and pos_adj2. The values pos_adj1 and pos_adj2 are calculated by positive adjustment circuit 1230 to avoid underflow.

More particularly, pos_adj1 is introduced to correct R_low, G_low, B_low for underflow. Avoiding underflow (i.e. a negative value Rw, Gw, Bw or Ww) is more important than avoiding overflow because the overflow can be corrected by scaling 150. If the minimum of R_low, G_low, B_low is negative, then pos_adj1 is set to the negative of the minimum (lines ACM59-ACM60). Otherwise, pos_adj1 is set to 0, i.e. no correction is needed (line ACM62). Then R_low, G_low, B_low are incremented by pos_adj1 (lines ACM64-ACM66). The result is shown as R_low_pos, G_low_pos, B_low_pos.

The value pos_adj2 is introduced to avoid possible underflow in ACC block 320. More particularly, in lines ACM69-ACM71, the ACC-adjusted RGB output of block 320 is estimated as the sum of (R_low_pos, G_low_pos, B_low_pos) and (Dr, Dg, Db). The sum is shown as (R_low_cc, G_low_cc, B_low_cc). If the minimum of these three values is negative, then pos_adj2 is set to the negative of the minimum (lines ACM72-ACM74). Otherwise, pos_adj2 is set to zero (line ACM76).

Computation of RGB_adj (line ACM83) and subsequent processing are performed by adjustment block 1240. In lines ACM84-ACM91, the value RGB_adj is adjusted to reduce the possibility of underflow of the white value Ww when the metamer adjustment is performed in line ACM95. The white decrement W_adj is initially computed as RGB_adj/$M_2$ (line ACM84), but then is hard-clamped to the maximum of Ww (line ACM85), and then RGB_adj is re-calculated as W_adj*$M_2$ (line ACM87).

Of note, lines ACM89-ACM90 show another embodiment without correction to avoid underflow. In either case, the new metamer values R, G, B, W are computed in lines ACM86, ACM92-ACM99 by adding RGB_adj to the RwGwBw outputs of block 130.2 and subtracting W_adj from the Ww output. Then the new metamer's coordinates are hard clamped to the minimum of zero (lines ACM97-ACM100).

TABLE 2

ACCMET

| | | |
|---|---|---|
| ACM1. | MINIACC = MINIACC or 1 | |
| ACM2. | if MINIACC == 1 then | |
| ACM3. | W_predict = Ww | -- 14 bit W |
| ACM4. | W_predict = math.floor(W_predict/(2^(GAMBITS–7))) --shift right 7 bits, use only the upper 7 bits of W | |
| ACM5. | W_predict = math.floor(W_predict*(WG+1)/256) --white gain can decrease white here | |
| ACM6. | W_predict = math.floor(W_predict*INVy/256) --use old post scale value | |
| ACM7. | W_predict = math.min(W_predict,127) --clamp it to 7 bits for looking up in the table | |
| ACM8. | Dr = accRmini[W_predict] | --RGB delta values are fetched |
| ACM9. | Dg = accGmini[W_predict] | --these are 7bits (6 + sign bit) |
| ACM10. | Db = accBmini[W_predict] | |
| ACM11. | Dr = math.floor(Dr*LEDy/4) | --multiply the delta values by |
| ACM12. | Dg = math.floor(Dg*LEDy/4) | --the inverse of INVy, which is 2*LEDy |
| ACM13. | Db = math.floor(Db*LEDy/4) | --/128 would do the 2*, but we need to multiply by 32 |
| ACM14. | | --to get into the range of the 14bit RGB values, leaving only /4 |
| ACM15. | else | |
| ACM16. | W_predict = Ww | -- 14 bit W |
| ACM17. | --W_predict = math.floor(W_predict/(2^(GAMBITS–7))) --shift right 7 bits, use only the upper 7 bits of W | |
| ACM18. | W_predict = math.floor(W_predict*(WG+1)/256) --white gain can decrease white here | |

TABLE 2-continued

ACCMET

| | |
|---|---|
| ACM19. | W_predict = math.floor(W_predict*INVy/256)   --use old post scale value |
| ACM20. | W_predict = math.min(W_predict,MAXCOL)   --clamp it to MAXCOL bits for looking up in the table |
| ACM21. | Dr = accRdel[W_predict]   --RGB delta values are fetched |
| ACM22. | Dg = accGdel[W_predict] |
| ACM23. | Db = accBdel[W_predict] |
| ACM24. | Dr = math.floor(Dr*LEDy/128)   --multiply the delta values by |
| ACM25. | Dg = math.floor(Dg*LEDy/128)   --the inverse of INVy, which is 2*LEDy |
| ACM26. | Db = math.floor(Db*LEDy/128)   --/128 would do the 2*, but we need to multiply by 32 |
| ACM27. | end |
| ACM28. | -- Lower power metamer adjustment |
| ACM29 | -- --------------------------------------------------------------------------------- |
| ACM30. | -- Try to reduce the future power requirement of the metamer |
| ACM31. | -- by finding the delta value that will affect the peak RGB value (power requirement) of the pixel |
| ACM32 | -- and then by using that value to push the metamer in the opposite direction |
| ACM33. | |
| ACM34. | -- Perform a trial color correction to examine peak values |
| ACM35. | R_corr = Rw+Dr |
| ACM36. | G_corr = Gw+Dg |
| ACM37. | B_corr = Bw+Db |
| ACM38. | min_RGB_corr = math.min(R_corr, G_corr, B_corr) |
| ACM39. | max_RGB_corr = math.max(R_corr, G_corr, B_corr) |
| ACM40. | LOW_POW= LOW_POW or 0 |
| ACM41. | if LOW_POW ==1 then |
| ACM42. | if   max_RGB_corr == R_corr then |
| ACM43. | neg_adj = −Dr/2 |
| ACM44. | elseif max_RGB_corr == G_corr then |
| ACM45. | neg_adj = −Dg/2 |
| ACM46. | elseif max_RGB_corr == B_corr then --this case is not likely |
| ACM47. | neg_adj = −Db/2 |
| ACM48. | end |
| ACM49. | else |
| ACM50. | neg_adj = 0 |
| ACM51. | end |
| ACM52. | ... |
| ACM53. | ... |
| ACM54. | -- Examine the proposed low-power metamer and see if it has gone negative and by how much |
| ACM55. | R_low = Rw + neg_adj |
| ACM56. | G_low = Gw + neg_adj |
| ACM57. | B_low = Bw + neg_adj |
| ACM58. | minRGB_low = math.min(R_low, G_low, B_low) |
| ACM59. | if minRGB_low < 0 then |
| ACM60. | pos_adj1 = −minRGB_low -- reverse the negative sign and store it as a positive adjustment |
| ACM61. | else |
| ACM62. | pos_adj1 = 0 |
| ACM63. | end |
| ACM64. | R_low_pos = R_low + pos_adj1 -- push up the RGB component so that low-power metamer isn't negative |
| ACM65. | G_low_pos = G_low + pos_adj1 -- |
| ACM66. | B_low_pos = B_low + pos_adj1 |
| ACM67. | -- Perform a trial color correction to see if it might go negative in the future and then do an optional prevention |
| ACM68. | -- --------------------------------------------------------------------------------- |
| ACM69. | R_low_cc = R_low_pos + Dr   -- = Rw + Dr + neg_adj + pos_adj1   = R_corr + neg_adj + pos_adj1 |
| ACM70. | G_low_cc = G_low_pos + Dg |
| ACM71. | B_low_cc = B_low_pos + Db |
| ACM72. | minRGB_low_cc = math.min(R_low_cc, G_low_cc, B_low_cc) |
| ACM73. | if minRGB_low_cc < 0 then |
| ACM74. | pos_adj2 = −minRGB_low_cc -- reverse the sign and store it as a further positive adjustment |
| ACM75. | else       -- two positive adjustment are kept separate on purpose |
| ACM76. | pos_adj2 = 0   -- |
| ACM77. | end |
| ACM78. | ... |
| ACM79. | NEG_PREVENT = NEG_PREVENT or 0 |

TABLE 2-continued

ACCMET

```
ACM80.          if NEG_PREVENT==1 then
ACM81.              -- Calculate the preventative adjustment values required for the RGB
component and the W component
ACM82.              -- and make sure W doesn't go negative
ACM83.              RGB_adj = neg_adj + pos_adj1 + pos_adj2
ACM84.              W_adj = math.floor(M2_inv/32 * RGB_adj) -- M2_inv =
M0*M1_inv; boosting the RGB reduces the W
ACM85.              W_adj = math.min (Ww, W_adj)                      -- Do not
reduce W to a value lower than zero
ACM86.              W = Ww - W_adj
ACM87.              RGB_adj = math.floor(M2_reg/256 * W_adj)
ACM88.          else
ACM89.              RGB_adj = neg_adj                  -- no negative prevention
ACM90.              W_adj = math.floor(M2_inv/32 * neg_adj)
ACM91.          end
ACM92.          R_neg = Rw + RGB_adj    --
ACM93.          G_neg = Gw + RGB_adj    --
ACM94.          B_neg = Bw + RGB_adj    --
ACM95.          W_neg = Ww - W_adj
ACM96.
ACM97.          R = math.max(0, R_neg)       -- clamp any negatives to 0
ACM98.          G = math.max(0, G_neg)
ACM99.          B = math.max(0, B_neg)
ACM100.         W = math.max(0, W_neg)
ACM101.     return R,G,B,W
ACM102. end
END OF TABLE 2
```

Table 3 illustrates LUA code for another ACCMET embodiment. This embodiment corrects the Ww value while taking into account the actual, measured relationship between the white chromaticity and the chromaticities of the red, green and blue subpixels. More particularly, in the above Table 2 line ACM84, the white adjustment value W_adj is calculated as RGB_adj/M2; then Ww is decremented by W_adj (line ACM95), and correspondingly Rw, Gw, Bw are each incremented by RGB_adj (lines ACM92-ACM94). This computation assumes that a white subpixel's chromaticity is equal to the chromaticity provided by a red subpixel, a green subpixel, and a blue subpixel together at equal values Rw=Gw=Bw. In an actual display, this assumption may be untrue. In the embodiment of Table 3, this assumption is abandoned. In lines AMT34-AMT36 of Table 3, the white decrement is shown as Wm, and a white subpixel's value of 1 corresponds in chromaticity to experimentally determined values for one red, one green and one blue subpixels. These values are shown respectively as:

RWR_REG/128, GWR_REG/128, BWRREG/128

Therefore, when the Ww coordinate is decremented by Wm (line AMT37), the red, green and blue coordinates Rw, Gw, Bw are incremented, at lines AMT34-AMT36, by respective values shown as Wm*(RWR+1)/128, Wm*(GWR+1)/128, Wm*(BWR+1)/128. (The addition of 1 is done for proper rounding in integer arithmetic.)

This technique of taking into account the relationship between the white chromaticity and the red, green and blue chromaticities can be applied to the embodiment of Table 2 or other embodiments. Of note, the Table 2 embodiment is designed to reduce power consumption. The Table 3 embodiment does not address power consumption. The Table 3 embodiment attempts to prevent the ACC 320 from generating negative Rw, Gw, Bw, Ww coordinates. More precisely, the Table 3 embodiment attempts to prevent ACC 320 from generating negative Bw coordinates. The blue coordinates are singled out because in many displays (including many LCDs) the white subpixels emit bluish light, and consequently the blue coordinates are more likely to become negative in ACC than the red and green coordinates. (Any negative coordinates output by ACC 320 can be hard-clamped to zero.)

In more detail, the embodiment of Table 3 operates as follows. Lines AMT2-AMT10 are similar to lines ACM3-ACM13 of Table 2. The value W in Table 3 corresponds to W_predict in Table 2. The W value is not truncated (in contrast with line ACM4), but is hard-clamped to the maximum of MAXCOL in line AMT4. In lines AMT11-AMT13, the coordinates Rw, Gw, Bw are incremented by Dr, Dg, Db respectively, and the results are denoted Rn, Gn, Bn. The values Rn, Gn, Bn are thus the red, green and blue predicted outputs of ACC 320. The minimum of Rn, Gn, Bn is computed as Mn (line AMT15), and the negative of Mn is denoted as RGBm (line AMT18). The remaining steps of Table 3 are performed only if Mn is negative (line AMT16).

At lines AMT24-AMT26, the values WBR_REG, GWR_REG, BWR_REG are calculated from data stored in internal registers. At line ATM29, the white decrement Wm is calculated as RGBm/BWR_REG (or rather as RGBm*WBR_REG where WBR_REG is the inverse of BWR_REG). At lines AMT30-AMT32, the Wm decrement is hard-clamped to the maximum permissible value of Ww (since Ww should not become negative when the decrement is applied, at line AMT37). At lines AMT34-AMT36, the Rw, Gw, Bw coordinates are incremented by values calculated from Wm as described above, and at line AMT37 Ww is decremented.

Lines AMT41-AMT52 illustrate another, simpler embodiment in which the red, green and blue coordinates are incremented by RGBm. More particularly, the white decrement Wm is set to RGBm/M2 (see line AMT42), hard-clamped to the maximum of Ww (lines AMT43-AMT45), RGBm is recomputed as Wm*M2 (lines AMT46) in case the hard clamp changes Wm, and then the red, green and blue coordinates are incremented by RGBm (lines AMT48-AMT50). Ww is decremented by Wm in line AMT51. This embodiment does not take into account the chromaticity relationship between the white subpixels and the red, green and blue subpixels.

TABLE 3

ACCMET

```
AMT1.    function Accmet(Rw,Gw,Bw,Ww)
AMT2.      local W=math.floor(Ww*(WG+1)/256)        --perform white gain
AMT3.      W = math.floor(W*INVy/256)               --perform part of the post scale
AMT4.      W = math.min(W,MAXCOL)                   --prevent OOG W
AMT5.      local Dr = ACCInterp(W,accR256)          --perform the Delta ACC lookup
AMT6.      local Dg = ACCInterp(W,accG256)
AMT7.      local Db = ACCInterp(W,accB256)          --currently B is only delta
              that can be negative
AMT8.      Dr = math.floor(Dr*LEDy/128) --invert this into pre-(post scale) space
AMT9.      Dg = math.floor(Dg*LEDy/128)
AMT10.     Db = math.floor(Db*LEDy/128)
AMT11.     local Rn=Rw+Dr                           --perform the Delta ACC
AMT12.     local Gn=Gw+Dg
AMT13.     local Bn=Bw+Db
AMT14.     local test=0             --debugging only
AMT15.         local Mn=math.min(Rn,Gn,Bn)    --find the minimum of all three
AMT16.     if Mn<0 then                             --will any go negative?
AMT17.        test=255 --white dot indicates metamer
AMT18.        local RGBm = - Mn
AMT19.
AMT20.     --separate R,G,B metamer adjust
AMT21.
AMT22.     RGB_SEP= RGB_SEP or 1
AMT23.     WBR_REG= WBR_REG or 91   --White to blue metamer
              ratio ; 8bit registers ; 127 is unity ; max value is 255 representing
              ratio of two
AMT24.     RWR_REG= RWR_REG or 131 --red to white metamer ratio
AMT25.     GWR_REG= GWR_REG or 107 --green to white metamer ratio
AMT26.     BWR_REG= BWR_REG or 176 --blue to white metamer ratio
AMT27.
AMT28.         if RGB_SEP==1 then
AMT29.            local Wm= RGBm * (WBR_REG+1)/128          -- typically
              convert the negative blue value to white value (please note
              WBR=1/BWR)
AMT30.            if Ww-Wm < 0 then        --don't let white value go negative
AMT31.               test=190 --grey indicates full metamer out of reach
AMT32.               Wm=Ww
AMT33.            end
AMT34.            Rw = Rw + (Wm * (RWR_REG+1)/128 -- white adjust value is
              converted to red adjust value
AMT35.            Gw = Gw + (Wm * (GWR_REG+1)/128 -- white adjust value is
              converted to green adjust value
AMT36.            Bw = Bw + (Wm * (BWR_REG+1)/128 -- white adjust value is
              converted to blue adjust value
AMT37.            Ww = Ww - Wm
AMT38.
AMT39.     --combined RGB metamer adjust
AMT40.
AMT41.         else                     --add this to RGB to prevent that
AMT42.            local Wm = math.floor(M2_inv*RGBm/32) --scale RGBm to make
              Wm a metamer
AMT43.            if Ww-Wm < 0 then     --don't let Wm go negative either
AMT44.               test=190 --grey indicates full metamer out of reach
AMT45.               Wm=Ww --the maximum metamer change we can do is this
AMT46.               RGBm = math.floor(M2_reg*Wm/256)      --scale Wm to
              make RGBm a metamer
AMT47.            end
AMT48.            Rw = Rw+RGBm                      --generate the metamer
AMT49.            Gw = Gw+RGBm
AMT50.            Bw = Bw+RGBm
AMT51.            Ww = Ww-Wm
AMT52.         end
AMT53.
AMT54.     end
AMT55.     return Rw,Gw,Bw,Ww
AMT56. end
END OF TABLE 3
```

Figure 13:
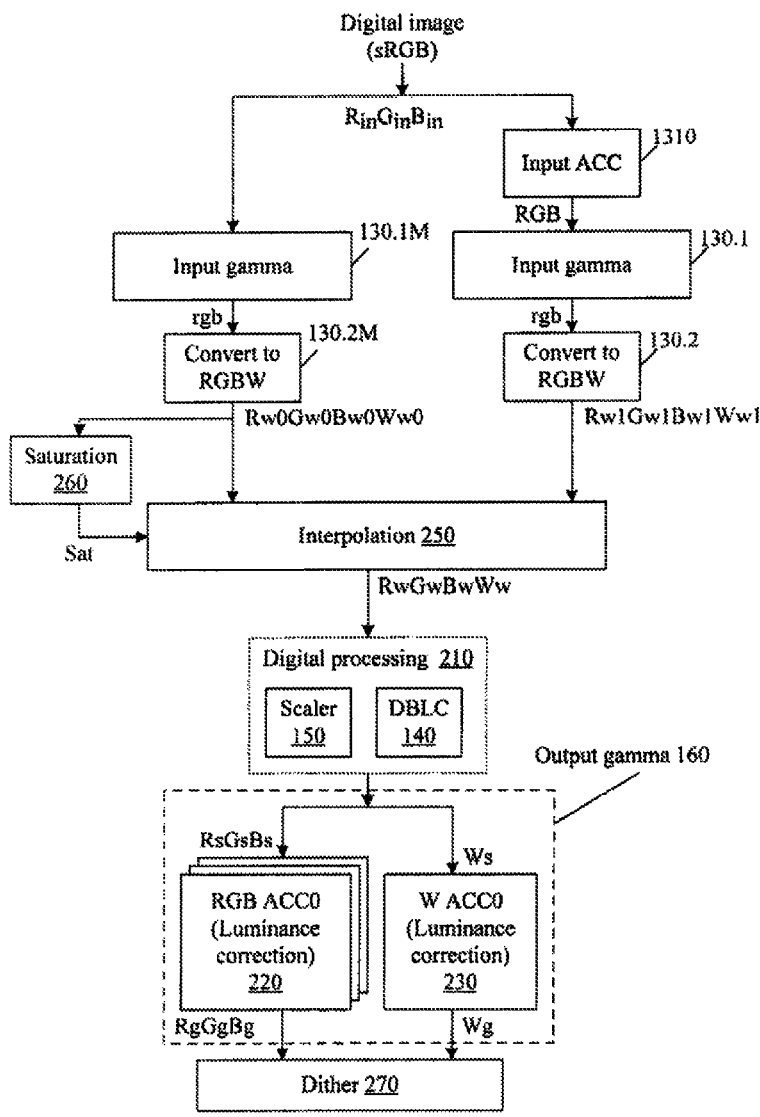

FIG. 13 illustrates display circuitry according to another embodiment of the vector method. The data path following dither block 270 is as in FIG. 2 or 3. Output gamma 160 of FIG. 13 can be as in FIG. 3, with only ACC0 tables 220, 230. The table 230 corrects the white luminance but not the white chrominance. Tables 220, 230 can be constructed using known techniques. For fully saturated colors, when Wg=0, tables 220 ensure correct color display.

The white chrominance is corrected by input ACC block 1310 constructed as described below. Input ACC block 1310 receives sRGB data $R_{in}G_{in}B_{in}$ and outputs sRGB data "RGB" to provide correct white luminance for when $R_{in}=G_{in}=B_{in}$. The RGB output of ACC block 1310 is converted to linear RGB data "rgb" by input gamma block 130.1, and the rgb output of block 130.1 is converted to linear RGBW data Rw1, Gw1, Bw1, Ww1 by block 130.2. The blocks 130.1, 130.2 can be as in FIG. 6 for example. Alternatively, input ACC 1310 can be combined with Input gamma 130.1.

The input sRGB data $R_{in}G_{in}B_{in}$ are also provided to input gamma block 130.1M which can be identical to block 130.1 of FIG. 6. The rgb output of block 130.1 is converted to sRGB data Rw0, Gw0, Bw0, Ww0 by block 130.2M which can be identical to block 130.2 except as described below. The blocks 1301.M, 130.2M are designed to provide correct color display for fully saturated colors. These blocks do not perform any color correction because the correct color display for fully saturated colors is achieved by means of ACC0 tables 220 as described above.

The RGBW outputs of blocks 130.2, 130.2M are supplied to interpolation circuit 250. The select input of interpolation circuit 250 receives the Sat output of block 260. Block 260 can be like in FIG. 2. For example, in some embodiments of FIG. 13:

$$Sat=Ww0/\max(Rw0,Gw0,Bw0,1)$$

Alternatively, Sat can be generated as:

$$Sat=Ww1/\max(Rw1,Gw1,Bw1,1) \quad (12)$$

Interpolation circuit 250 can be as in FIG. 2, and in particular it may perform linear or non-linear interpolation. In the case of linear interpolation, if Sat is between 0 and 1 inclusive, in some embodiments the output RwGwBwWw of interpolation circuit 250 is:

$$Rw=Sat*Rw1+(1-Sat)*Rw0$$

$$Gw=Sat*Gw1+(1-Sat)*Gw0$$

$$Bw=Sat*Bw1+(1-Sat)*Bw0$$

$$Ww=Sat*Bw1+(1-Sat)*Ww0 \quad (13)$$

Thus, if the input sRGB data $R_{in}G_{in}B_{in}$ define a white or nearly white color, then the Ww0 value will be high (e.g. equal to the maximum of $R_{in}$, $G_{in}$, $B_{in}$), so Sat will be close to 1, and hence RwGwBwWw will be close to the white-chrominance-corrected output Rw1Gw1Bw1Ww1 of block 130.2. For saturated colors, Sat will be close to 0, and hence RwGwBwWw will be close to the uncorrected output Rw0Gw0Bw0Ww0 of block 130.2M.

Digital processing block 210 may include scaling and DBLC operations 150, 140 as in FIG. 7 for example.

The input ACC tables 1310 for the red, green and blue data are constructed after output gamma table 160 by providing sRGB data $R_{in}=G_{in}=B_{in}$ at different levels and measuring the white color displayed on screen 126. The tables 1310 are constructed to provide the RGB output such that the white color would be the ideal or near-ideal color at each sRGB input level $R_{in}=G_{in}=B_{in}$.

RGBW generation block 130.2M can be identical to block 130.2. In some embodiments however the block 130.2M generates low Ww0 (e.g. Ww0=0) if the input color is dark even if the input color is "grey" or close to grey, where "grey" denotes a color identical to white in chrominance. The reason for this construction is that humans are more perceptive to brightness variations of dark colors, so quantization errors of dark colors are particularly noticeable. If Ww0 is set to 0, then the RGB coordinates Rw0, Gw0, Bw0 will be increased, the corresponding subpixels will be brighter, and hence quantization errors will be less noticeable. Due to the selection of low Ww0 for dark colors, the output of interpolation block 250 will be close to the non-ACC-adjusted value Rw0Gw0Bw0Ww0.

Thus the Ww0 value is a function of brightness defined by the rgb output of block 130.1M. If the rgb color is dark, the Ww0 function is zero or near zero. If the rgb color is bright, the Ww0 function is the same as the Ww1 function defined by block 130.2. As the rgb color changes from dark to bright, the Ww0 function of block 130.2M can increase from 0 to the Ww1 function gradually rather than abruptly to avoid artifacts.

Figure 14:
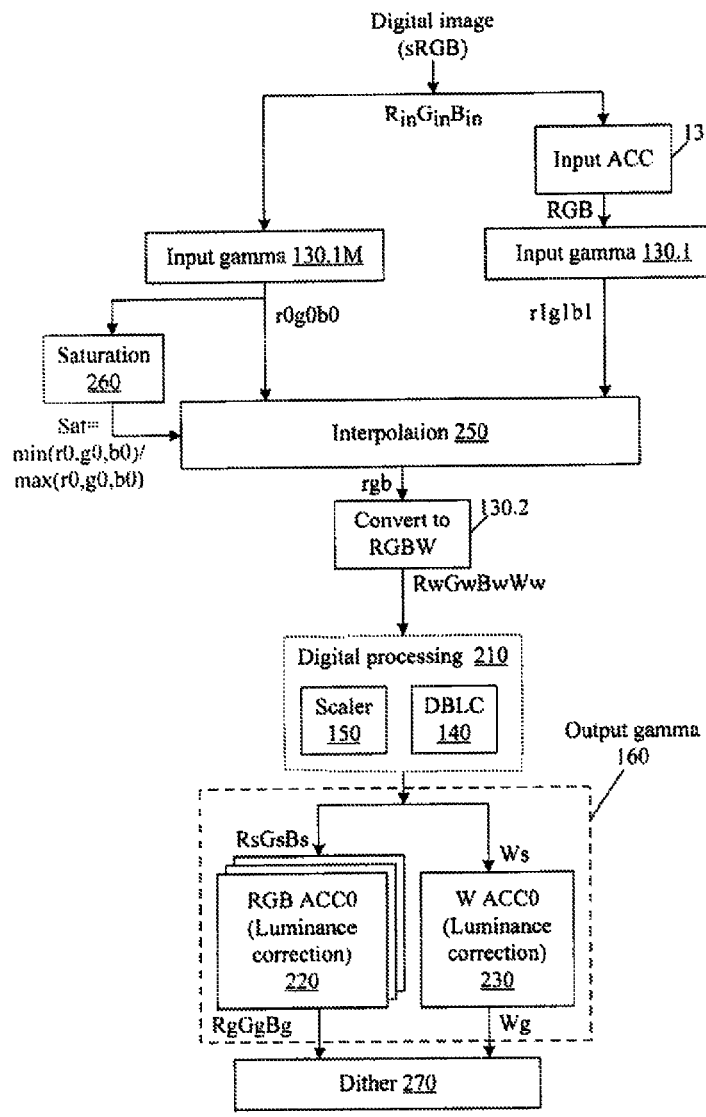

FIG. 14 shows a slightly less gate-intensive embodiment in which the interpolation 250 is performed before conversion to RGBW. Input ACC 1310, input gamma 130.1 and 130.1M, output gamma 160, and block 210 can be as in FIG. 13. The output of input gamma 130.1 is shown as r1g1b1, and the output of input gamma 130.1M is shown as r0g0b0. Block 260 can compute the Sat parameter as:

$$Sat=\min(r0,g0,b0)/\max(r0,g0,b0,1) \quad (14)$$

Alternatively, Sat can be generated as:

$$Sat=\min(r1,g1,b1)/\max(r1,g1,b1,1)$$

The output rgb of interpolation circuit 250 can be:

$$r=Sat*r1+(1-Sat)*r0$$

$$g=Sat*g1+(1-Sat)*g0$$

$$b=Sat*b1+(1-Sat)*b0 \quad (15)$$

Non-linear interpolation can also be used. The rgb output of block 250 is converted to RGBW by block 130.2 which can be as in FIG. 7. The output of block 130.2 is provided to digital processing block 210.

The invention is not limited to the embodiments described above. For example, the invention is applicable to displays other than RGB and RGBW. One example is RGBCW (Red, Green, Blue, Cyan, White) displays. In such displays, the white chrominance can be corrected by red, green, blue, and cyan subpixels. Also, the cyan chrominance may be corrected by green and blue subpixels. Other primary colors are possible.

The term "color coordinate" is sometimes used ambiguously herein to denote both a coordinate axis in a color space (e.g. R in RGB, or X in XYZ) and a value of the color coordinate (e.g. "Rw" in RGBW color space).

Some embodiments provide a method for processing image data for displaying an image by using a plurality of primary colors (e.g. RGBW or RGBCW or some other primary colors), the primary colors comprising a plurality of first primary colors (e.g. RGB) and one or more second primary colors (e.g. W).

The method comprises obtaining a color signal (e.g. RsGsBsWs in FIG. 2) representing one or more colors in the image, the color signal comprising a representation of an amount of each said primary color in the one or more colors. The amounts may be Rs, Gs, Bs, Ws for example.

The method further comprises obtaining a first signal (e.g. Rg0Gg0Bg0) incorporating a first correction of the color signal. The first signal is dependent on the amount of each of one or more of the first primary colors in said representation. E.g. the first signal may depend on Rs, Gs, and Bs, or just on Rs or Bs, and may depend on additional parameters, e.g. Ws.

The method comprises obtaining a second signal (e.g. Rg1Gg1Bg1) incorporating a second correction of the color signal, the second signal being independent of the amounts of the first primary colors in said representation but being dependent on one or more of the amounts of the one or more second primary colors in said representation. For example, in FIG. 2, Rg1Gg1Bg1 does not depend on Rs, Gs, Bs but depends on Ws.

The method comprises obtaining a relative-amount signal (e.g. Sat) which represents an indication as to a relative amount, in said representation, of at least one of the one or more second primary colors relative to at least one of the first primary colors. For example, the relative amount can be the inverse of Sat since the inverse of Sat still represents Sat hence represents the relative amount of Ws relative to the maximum of Rs, Gs, Bs.

The method comprises obtaining, from the first and second signals and the relative-amount signal, a combined-correction signal (e.g. RgGgBg) representing a combined correction which depends on the first and second corrections and on the relative amount.

In some embodiments, the first signal is independent of the amounts of the one or more second primary colors in said representation. For example, in FIG. 2, Rg0Gg0Bg0 is independent of Ws.

In some embodiments, the combined correction is closer to the first correction if the relative amount is smaller. For example, in FIG. 2, RgGgBg is closer to Rg0Gg0Bg0 if Sat is smaller.

In some embodiments, the relative amount is an increasing function of one or more of the amounts of the one or more second primary colors and is a decreasing function of one or more of the amounts of the first primary colors. For example, in FIG. 2, Sat is an increasing function of Ws and a decreasing function of each of Rs, Gs, Bs.

In some embodiments, the combined-correction signal defines the combined correction as one or more grey values in a non-linear color space.

In some embodiments, the amounts of each color are values of color coordinates in a linear color space.

Some embodiments provide an apparatus for displaying an image, the apparatus comprising circuitry for correcting a color signal representing one or more colors in the image, the color signal comprising values of color coordinates (e.g. RsGsBsWs) of each said color, the color coordinates being associated with a plurality of primary colors, the primary colors comprising a plurality of first primary colors (e.g. RsGsBs) and one or more second primary colors (e.g. Ws), the color coordinates of each color comprising first coordinates associated with the first primary colors and comprising one or more second coordinates associated with the one or more second primary colors.

The circuitry comprises a first circuit (e.g. table 220 of FIG. 2) for generating a first signal (e.g. Rg0Gg0Bg0) incorporating a first correction of the color signal, the first signal being dependent on values of one or more of the first coordinates in the color signal.

The circuitry comprises a second circuit (e.g. 240) for generating a second signal incorporating a second correction of the color signal, the second signal being independent of the values of the first coordinates in the color signal but being dependent on values of one or more of the one or more second coordinates in the color signal.

The circuitry comprises an interpolation circuit (e.g. 250) for generating a combined-correction signal by interpolation from the first and second signals based on an indication of a relative amount of at least one of the one or more second primary colors relative to at least one of the first primary colors.

Some embodiments provide an apparatus for displaying an image by using a plurality of primary colors (e.g. RGBW), the primary colors comprising a plurality of first primary colors (e.g. RGB) and one or more second primary colors (e.g. W), the apparatus comprising circuitry for correcting a color signal representing one or more colors in the image, the color signal comprising values of one or more color coordinates of each color (e.g. $R_{in}G_{in}B_{in}$ in FIGS. 13, 14).

The circuitry comprises a first data path for processing the color signal; and a second data path for processing the color signal; wherein the first and second data paths comprise shared circuitry. For example, in FIG. 13, the first data path may include the entire circuit except blocks 1310, 130.1, 130.2; the second data path may include the entire circuit except blocks 130.1M, 130.2M, 260. In FIG. 14, the first data path may include the entire circuit except blocks 1310, 130.1; the second data path may include the entire circuit except blocks 130.1M, 260.

The first data path comprises a first color correction circuit (e.g. 130.1M, or a combination of 130.1M and 160) comprising a separate color correction circuit (e.g. a separate table in input gamma 130.1M) for correcting each value of a plurality of first sets of the color coordinates. For example, the first sets may be a set $\{R_{in}\}$, a set $\{G_{in}\}$, and a set $\{B_{in}\}$. In some embodiments, each first set comprises one or more but less than all of the color coordinates of each color. In some embodiments, the separate color correction circuits of the first data path are operable to correct the color signal representing any one of the first primary colors to a predefined display quality. For example, in FIG. 13, the tables 130.1M are operable to correct the color signal representing any one of the red, green and blue primaries to a predefined quality.

The second data path comprises a second color correction circuit (e.g. 1310) comprising a separate color correction circuit for correcting each value of a plurality of second sets of the color coordinates, each second set comprising one or more but less than all of the color coordinates of each color, the second data path being operable to correct the color signal representing at least one second primary color to a predefined display quality. E.g., in FIGS. 13-14, the input ACC 1310 is operable to correct the color signal representing the white color to a desired quality.

The shared circuitry comprises an interpolation circuit (e.g. 250) for generating a combined-correction signal by interpolation from a signal obtained using the first color correction circuit and a signal obtained using the second color correction circuit, the interpolation being based on an indication (e.g. Sat) of a relative amount of at least one of the one or more second primary colors relative to at least one of the first primary colors in the one or more colors.

In some embodiments, the shared circuitry comprises a third color correction circuit (e.g. output gamma 160) connected downstream of the interpolation circuit, the shared circuit being for correcting amounts of the primary colors (e.g. amounts Rs, Gs, Bs).

Some embodiments provide a method for processing image data for displaying images in a display's screen unit comprising a plurality of subpixels, wherein each subpixel has a luminance depending on the subpixel's state defined using a corresponding subpixel value. The images are displayed using a light source providing light to the screen unit. The method comprises (1) obtaining image signals which represent each image using color coordinates; and (2) generating the subpixel values from the image signals. The operation (2) comprises, for each image IM1 of one or more of the images (e.g. for the image "c" in FIG. 8 or 9):

(2A) Generating a scaling-information signal (e.g. $INVy_{c-1}$ and/or $BL_{c-1}$) which represents scaling information which comprises information on an output power to be generated by the light source in displaying the image IM1 and on how the image signals representing the image IM1 are to be scaled to match the output power of the light source, the scaling information being dependent on one or more of the images;

(2B) Scaling values of the color coordinates of the image IM1 in accordance with the scaling information to generate a scaled-image signal;

(2C) Obtaining a color-correction signal (e.g. RwGwBwWw$_c$) representing a color correction for the scaled-image signal for the image IM1, the color-correction signal being used to provide at least one of the subpixel values.

In some embodiments, the scaling information in the scaling-information signal for the image IM1 is obtained from at least partial representation of the color correction for at least one image (e.g. a preceding image, e.g. image "c−1"). "At least partial representation of the color correction" may be the output RwGwBwWw$_c$ of ACC 320 as in FIG. 8, or the output dRw, dGw, dBw, dWw of ACC 320 as in FIG. 9, or some other representation.

Of note, scaling may involve multiplication of the values of the color coordinates by a fixed value such as INVy, but may also involve non-uniform scaling, i.e. some type of adjustment of the values of the color coordinates to the output power. For example, the color coordinates may be in a non-linear color space.

In some embodiments, generating the scaling-information signal for the image IM1 comprises generating an un-scale signal (e.g. the input of circuit 140 in FIG. 8 or 9) at least partially indicative of an adjusted color correction for the at least one image, the adjusted color correction being the color correction adjusted for an output power level independent of the scaling information for the at least one image (e.g. the output power level can be the reference level corresponding to the un-scaled output of circuit 130.2, in other words the reference level corresponding to BL=1), the un-scale signal being generated from the scaling information of the at least one image and from an at least partial representation of color correction for the at least one image.

Some embodiments provide an apparatus for processing image data for displaying images in a display's screen unit comprising a plurality of subpixels, wherein each subpixel is to have a luminance depending on the subpixel's state defined using a corresponding subpixel value, wherein the images are to be displayed using a light source for providing light to the screen unit. The apparatus comprises a circuit for obtaining image signals which represent images using color coordinates, and for generating the subpixel values from the image signals. The circuit comprises:

(A) a dynamic-light-source-control (DLSC) circuit for determining scaling information for the images (e.g. the circuit 810, 140, 804 of FIG. 8, or 810, 910, 140, 804 of FIG. 9), the scaling information comprising information on an output power to be generated by the light source in displaying the images and on how the image signals representing the images are to be scaled to match the output power of the light source;

(B) a scaler circuit (e.g. 150) for scaling values of the color coordinates of the images in accordance with the scaling information provided by the DLSC circuit and generating scaled values of the color coordinates;

(C) a color-correction circuit (e.g. 320) for correcting the scaled values and generating corrected scaled values of the color coordinates, the corrected scaled values being used to provide the subpixel values.

In some embodiments, the DLSC circuit is responsive to the color-correction circuit to generate the scaling information based on at least partial information on the corrected scaled values.

The display may or may not be SPR type.

Some embodiments provide a method for processing image data for displaying an image. The image comprises obtaining a color signal comprising color coordinates' values (e.g. RwGwBwWw in FIG. 6) of one or more colors in the image. For each said color (i.e. for each of the one or more colors recited above, and thus possibly for each color in the image or for each of a subset of colors in the image), the following operations are performed. From the color signal, a corrected-color signal is obtained (e.g. RwGwBw output of adder 310 and Ww output of circuit 210) which comprises corrected values of the color coordinates, the corrected values incorporating a correction of one or more of the color coordinates' values of said color for a display's transfer characteristic (e.g. the correction may involve correction of Rw, Gw, Bw but not Ww, but may involve other corrections). From the corrected-color signal, an adjustment signal is generated (e.g. RGB_adj_pcc in Table 1) incorporating information on an adjustment to be performed on the corrected values for the color. The corrected-color signal is modified with the adjustment signal to generate an adjusted-corrected-color signal (e.g. RwGwBwWw output of PCC metamer adjustment 604) comprising adjusted corrected values of the color coordinates of the color, the color coordinates comprising at least one color coordinate whose adjusted corrected value is greater than the corrected value and comprising at least one other color coordinate whose adjusted corrected value is smaller than the corrected value (e.g. RwGwBw may be increased while Ww is decreased, or vice versa).

In some embodiments, each color coordinate is associated with a respective primary color, the primary colors comprise a plurality of first primary colors (e.g. RGB) and one or more second primary colors (e.g. W), each second primary color being representable as a mixture of two or more first primary colors, and the color coordinates comprise first color coordinates associated with the first primary colors and comprise one or more second color coordinates associated with the one or more second primary colors;

The color coordinates comprise at least one first color coordinate whose adjusted corrected value is greater than the corrected value and comprise at least one second color coordinate whose adjusted corrected value is smaller than the corrected value, or the color coordinates comprise at least one second color coordinate whose adjusted corrected value is greater than the corrected value and comprise at least one first color coordinate whose adjusted corrected value is smaller than the corrected value.

Some embodiments provide an apparatus for processing image data for displaying an image, the apparatus comprising a circuit for processing a color signal comprising color coordinates' values of one or more colors in the image. The circuit comprises:

a color-correction circuit (e.g. 240, 310 in FIG. 6) for obtaining from the color coordinates' values, for each said color, corrected values of the color coordinates, the corrected values incorporating a correction of one or more of the color coordinates' values of said color for a display's transfer characteristic;

an adjustment circuit (e.g. 604) for determining if an adjustment to be performed on the corrected values, and if the adjustment is to be performed, then modifying the corrected values to generate adjusted corrected values of the color coordinates of the color, the modifying comprising increasing the corrected value of at least one of the color coordinates and decreasing the corrected value of at least one other color coordinate.

Some embodiments provide a method for processing image data for displaying one or more images in a display's screen unit comprising a plurality of subpixels, wherein each subpixel has a luminance depending on the subpixel's state defined using a corresponding subpixel value. The images are displayed using a light source providing light to the screen unit. The method comprises, for each image IM1 of one or more of the images, obtaining an image signal comprising color coordinates' values (e.g. output of block 130.2) of one or more colors in the image IM1. The method further comprises generating a scaling-information signal (e.g. INVy, BL) which represents scaling information which comprises information on an output power to be generated by the light source in displaying the image IM1 and on how the image signal representing the image IM1 is to be scaled to match the output power of the light source, the scaling information being dependent on one or more of the images. The method further comprises adjusting the image signal (e.g. by ACC-MET 1010) to obtain an adjusted image signal which represents the image IM1 using adjusted values of the color coordinates. The method further comprises scaling the adjusted values of the color coordinates of the image IM1 in accordance with the scaling information to generate a scaled-image signal (e.g. output of scaler 150) comprising scaled values of the color coordinates. The method further comprises obtaining, from the scaled-image signal, a color-correction signal (e.g. output of ACC 320) representing a color correction for the scaled-image signal for the image IM1, the color correction being a correction for the display's transfer characteristic, the color-correction signal being used to provide at least one of the subpixel values.

Further, for at least one color in the image IM1, the color coordinates comprise at least one color coordinate whose adjusted value is greater than the corrected value by a first amount (e.g. RGB_adj in Table 2) and comprise at least one other color coordinate whose adjusted value is smaller than the corrected value by a second amount corresponding to the first amount, the first and second amounts depending on the scaling information for at least one image.

In some embodiments, the color-correction signal comprises corrected scaled values of the color coordinates; and the adjusting operation comprises obtaining an estimate (e.g. Dr, Dg, Db) indicative of a change of at least one corrected scaled value relative to the corresponding scaled value, and comprises adjusting the corresponding value in the image signal such that if the corrected scaled value is greater than the corresponding scaled value, then the corresponding adjusted value is smaller than the corresponding value in the image signal, and if the corrected scaled value is smaller than the corresponding scaled value, then the corresponding adjusted value is greater than the corresponding value in the image signal.

Appendix: Additional Methods for Building ACC Tables

Measure Output Gamma:

When characterizing a display it is common to measure the gamma. The gamma is the luminance response curve of the display to a linear ramp of voltage or a linear ramp of digital input values. To best match the human eye for indoor viewing, the output gamma response curve should approximate a power curve with an exponent of 2.2. The brightness of the display is measured at a series of input points to see if it follows this curve. This data can be used to adjust resistor ladders in the display to make it more closely match the correct curve, or it can be used to generate a digital table that corrects values to compensate for the display.

Input and Output Gamma:

The 2.2 gamma response of a display means that all data sent to a display has a non-linear assumption. An input value half way through the range does not map to a brightness that is radiometrically half way between the darkest and brightest value. It is difficult to do arithmetic on these non-linear values and get the correct results. Because of this, we usually convert all color values to linear values at the beginning of our "gamma pipeline", do all the processing in these linear values, and convert them back to non-linear values at the end. These conversions can be done with LUTs (Look-Up-Tables) or a computational module or a combination. Conversion to linear values at the beginning of the gamma pipeline is usually done with the "sRGB assumption", a standard specifying the non-linear quantization assumption in most small computer image files. Converting back to non-linear at the end then could simply be the inverse of the sRGB input gamma However, if the output conversion back to non-linear is the inverse of the measured display gamma instead, then the output conversion will also compensate for any irregularities in the display. With the output gamma completely canceled, the only remaining gamma will be a perfect sRGB curve.

Gamma on Each Channel:

The gamma response curve of each channel (R G B and W in our case) in the display is measured separately, so there are four different output gamma tables. This is done in ACC, e.g. in the output gamma 160 of FIG. 1. The same tables can be used as the ACC0 Luminance correction tables 220 in FIGS. 2 and 3, among others. On other multi-primary displays there may be different or additional output tables. Typically the same input gamma curve is used on all the input channels since this is an assumption about the source data, not the output display. We take the luminance measurements from R G B and W and condition each of them using a custom program called Gamma_Curve. This program interpolates missing values when a complete dataset is not available, using a cubic interpolation algorithm. It converts floating point measurement values into integer values that are normalized to the range of values that the hardware can store in LUTs. If necessary, this program can also generate an input gamma curve that is the inverse of the conditioned output gamma curve. (This will be used in the discussion below).

Chromaticity Measurements:

The luminosity measurements are taken with a colorimeter which can also measure the chromaticity of the display. It is quite common to measure just the chromaticity of each channel at the brightest setting. From these chromaticity values and the brightest luminance value on each channel it is possible to generate a matrix that converts from display values to CIE XYZ tri-stimulus values. From XYZ it is possible to convert into almost any other color space, such as sRGB, Lab, Luv, YCbCr, etc.

In the case of a display with three primaries, such as an RGB display, the conversion matrix can be inverted and used to convert XYZ colors into values suitable for use on the particular display. This can allow you to more accurately display colors on a display, or to display colors that come from sources other than RGB files. In the case of an RGBW display, or any multi-primary display with more than 3 primaries, the conversion matrix from RGBW to XYZ is not square and cannot be inverted. This is the same as stating that there four unknowns but only three equations. A single solution is not always possible, and conversion to RGBW has to be done with an algorithm as in (9).

Chromaticity Ramp Measurements:

As impressive as linear algebra and matrix arithmetic sounds, the conversion matrixes developed above have a huge assumption: The matrix is built from measurements of just a few bright values, and assumes that the chromaticity remains constant all the way down through dark values to black. If measurements of the chromaticity are taken at all brightness values, you will find that this assumption is often not correct: The chrominance values drift as the brightness of the display changes. Leakage is one problem that you will see in the dark colors: The chromaticity of all the primaries will appear to change to that of grey-white as they approach black. This is expected and cannot be avoided. Changes in the chromaticity of the brighter colors, however is undesirable. This can cause visual defects even in an RGB display, such as mid-level grays looking yellow or blue compared to the full on white. In the case of DBLC (Dynamic Back Light Control), changes in the chromaticity with input level can cause the "full on white" to change color as the backlight is turned up and down while the LCD is turned down and up to compensate. The goal of our ACC is to compensate for this change in chromaticity with input value. The measurements of luminance and chromaticity for a range of input values on all the primaries allows us to build ACC tables to do this.

Conditioning the Measurements:

The measurements taken are luminance and chrominance for a ramp of input values for R G B and W separately. Typically a display will accept 256 different input values. It is not necessary to measure all of these input values, as long as the darkest and brightest and sufficient values between are measured. Normally we take 32 evenly spaced measurements of each primary, plus a 33rd brightest possible value. There is always a certain amount of noise in these measurements so the data is filtered to average out some of this noise. A simple box filter is currently used. After filtering, we interpolate the values to produce a dataset that does have 256 values. This allows using values in the normal range as the device and the normal tables, such as the input gamma table, when doing simulations. Currently we are using a cubic interpolation that generates points smoothly between the measured values.

Our colorimeter records measurements as CIE xyY values. The x,y values are the chrominance, the capital Y is the luminance. CIE xyY values are linear values by design, however, our input samples are effectively spaced non-linearly. The luminance curves on a perfect display would look like 2.2 power curves if plotted on simple graph paper. If plotted on the correct power-axis graph paper they would look like straight lines. In our gamma pipeline we use an sRGB input gamma LUT to linearize input vales. The same thing could be done with the measured data to bring the samples into a linear space. The result is a sparse dataset, so it is also interpolated to the full bit width of the interior of the gamma pipeline. Typically this stretches the input values to 12 bits wide. At this point the measurement values are still stored as floating point.

However, using the same sRGB input gamma that is used in the pipeline may not be the correct one to use. Instead, we take the output gamma from each channel and invert those into input gamma tables. (Using the same program described above that generated the output gamma tables). Since the output gamma tables were generated from the luminance data, this process should convert the luminance data to a straight line on all channels. This is rarely precisely achieved because we use input and output gamma tables that have been rounded to integers. This more closely simulates the behavior of our digital hardware, but introduces a little quantization noise.

When this linearization process is done to the chrominance data, it changes the spacing of the sample points, concentrating them more on the dark than on the bright end of a ramp. In either non-linear or linear space, we would like the chromaticity to be constant for any input value, a horizontal line. But the characteristics of the LCD shutters cause the chromaticity to vary. In addition leakage through the LCD display causes the chromaticity to turn towards grey-white at some point, as mentioned above. One of our data conditioning steps is to try to detect where this leakage starts to dominate and linearly interpolate the chrominance values down from there. This prevents our ACC correction from attempting to correct for leakage in dark colors.

Converting Any Input Color to CIE XYZ:

The result of the data conditioning steps is a set of tables which, given a linear color value, can look up the CIE xyY value that would be produced by the hardware. The measured values are only from separate ramps of R G B and W, but we can convert xyY values into XYZ values which can be summed together. This allows us to predict color values for any of the 17 million colors that the display can produce. We also measure a few other ramps, one with the R G B values increasing together, another with R G B and W increasing together. Comparing these measured combined values with the results of summing the separate R G B and W values together gives us some confidence that the theoretical summing of XYZ values correctly simulates the summing of colors optically on the display.

ACC Table Construction:

A CIE XYZ graph of the chromaticity of a black to white ramp (R G B and W all increasing from 0 to max together) should be a straight line, the line of grays. Due to chromaticity drift as the voltage changes in an LCD cell, this is rarely true. A ramp of all the white ramp values is generated and converted to CIE XYZ using the table method as described above. This produces the uncorrected gray ramp. The goal of our ACC process is to change the RGBW values slightly to bring the color back onto a desired straight line of grays. It is possible to start with a desired white point in CIE XYZ space and generate a series of gray values that linearly increase from black to white. 256 values are simply interpolated between black (all zeros) and the white point. Using the measured 100% white point of the display (R G B and W on full) produces ACC tables with the smallest possible values. The purpose of ACC is to linearize the line of grays, but it could also be used to change the color temperature of the display by choosing a desirable white point such as D65. If this is done, the size of the final ACC table values may increase requiring more storage or even becoming too large for practical use.

For each uncorrected gray ramp value we now have a desired gray value. The uncorrected values are in RGBW and in CIE XYZ, the desired gray ramp values are only in CIE XYZ. We have a simple process for converting RGBW to CIE XYZ but as mentioned above, there is no simple way to do the reverse. So we cannot simply convert the desired grey ramp values to RGBW. However, because we can do the reverse, if we stumbled upon a good combination of RGB&W, we can verify whether or not it is close to the desired grey ramp value. With this we can use numerical solving techniques to search for the closest RGBW combination that produces the desired grey ramp XYZ value. There are many numerical solving methods in the mathematical literature. Most of them are designed for solving continuous functions and many of them require that you know the derivatives of the functions. A secondary goal of many of these methods is to find the minimum value in the fewest possible steps. We have a discontinuous function, RGBW values can only change in integer steps, and we do not have a function for the rate of change in XYZ as RGBW changes. However, we do not care how many steps it takes to find a solution, since we can run this process once and use it to build a table that is accessed rapidly later. So a brute force method is perfectly adequate, and on a modern PC it turns out this only takes a few seconds anyway.

To numerically find the RGBW set that most closely produces a desired CIE XYZ value, we start with an initial guess of the RGBW values. One reasonable initial guess would be the uncorrected RGBW value that corresponds to the desired grey ramp value. A better initial guess would be the solution from a nearby point. In the current code, a combination of the two is used: an uncorrected value in the middle of the range is used as the initial guess. From this it takes many iterations to find the best solution. Then this first solution is used as the initial guess to find the next element up or down in the table. From this it takes fewer iterations to find the minimum. Each successive solution is used as the guess for the next solution up or down until the table is completed.

Starting with an initial guess, we simply change the R G B and W values by +/−1, convert to CIE XYZ, and compare that to the desired CIE XYZ value. If the 'distance' to the desired value has decreased, we are closer to the solution. Converting the CIE XYZ values to CIE Lab co-ordinates and calculating the distances in that color space would be one way to generate a distance that is generally considered meaningful. (CIE Lab was designed so that a Pythagorean distance of 1.0 would be a "just noticeable distance" to a standard observer). In the spirit of doing a brute force approach, we are simply using the Pythagorean distance in CIE XYZ space to calculate a distance. Although distances in XYZ space are generally not considered to be meaningful, it is a reasonable practical method of getting a rough estimate of the closeness of our solution. Changing the R G B and W values by +/−1 and moving in that direction when the distance decreases causes our solver to "walk down hill" to a minimum distance and the closest RGBW set that match the desired gray ramp value. Currently our ACC methods are all indexed by the W value, so we typically hold the W values constant and only allow the solver to walk down hill on the R G and B axes.

On the displays that we have seen so far, the chromaticity of the white ramps have typically had too much blue. So the corrected RGBW values have decreased blue values and slightly increased red and green. Because green carries more of the luminance than blue, the result has been a slight increase in the luminance curve of a gray ramp. One solution to this would be to allow the solver to change the W value to bring the luminance back to the original level. Because our tables are indexed by W our preferred embodiment avoids this. Another solution to the increased luminance after ACC is to characterize the new luminance curve, and change the output gamma table for W to compensate.

Using the tables from measurements to convert linear RGBW to XYZ can only convert values that are in-gamut. If the solver follows the slope off the edge of one or more of the tables, this probably means that there is no good solution. This typically happens on the dark or bright ends of the ramp where there is little room to move away from the line of grays. In these cases, we stay just inside the gamut and find the best solution possible.

The result of running the solver on every gray ramp value is a table of corrected RGBW values that more closely produce the desired line of grays when displayed on the hardware. This table is an intermediate step, it is used to generate other tables that are used in several different ACC methods.

Vector ACC Method:

In the vector ACC method, we interpolate between a grey ramp corrected RGBW value and the uncorrected RGBW value, based on the saturation of the color. This interpolation is done after output gamma, so the table of corrected values developed above could be used if the results are immediately run through the output gamma tables. However, those two steps can be convolved together resulting in one table for R G and B. This is the ACC1 Chroma correction table 240 of FIG. 2. There would be three tables, but since they are all indexed by the same Ws value, they can be combined into one table with a single address decoder. If looked at as separate tables, they would look similar to the R G and B ACC0 luminance correction tables.

Delta ACC Method:

In the delta ACC method, we calculate the RGB distance between the corrected and uncorrected RGBW grey ramp values. These are stored in a delta ACC chroma correction table 240 of FIG. 3. Some conditioning is done on the delta table before using it. Typically the delta values should approach zero at the dark and bright ends of the ramp. But because the solver error increases near the ends, the delta table often becomes noisy in these areas. We often clamp the values to zero or force them to ramp down to zero near the ends to remove this noise. The rest of the delta ACC table can also be noisy, so we filter it to smooth out discontinuities that might produce visible effects in images. At run time, the delta ACC table is indexed by the Ws value and added to every R G and B value in the pipeline.

Simulating the Effects of the Delta ACC tables.

After building the tables, we burn them into EEPROMs in display hardware and measure the effect on grey scale ramps, among other images. Before the hardware is ready it is possible for us to use the tables to simulate the expected effects, at least on a black to white ramp, and see if the ACC tables will linearize the chromaticity. The first method used was a short-cut. A ramp of input values is run through the input gamma table. In a grey scale ramp, the resulting R G B and W values all ramp together, so simulating the conversion (9) was unnecessary. The W value is used to index the delta ACC table and the deltas are added to the R G and B. The tables generate above are used to convert this to CIE XYZ, then converted to the CIE xyY values that the colorimeter will produce. These are plotted as predictions and compared against the measured values. The results have been a very good match between theory and practice.

The above method produced CIE XYZ values directly from linear RGBW values. This is the short-cut because it did not take the output gamma tables into account. This was considered reasonable since the output gamma and the display measurements are supposed to be inverses of each other. This inversion is done with the luminance values, and might not have the correct effect on chromaticity. To investigate this, we did a second more complete simulation. A ramp of input value is run through the input gamma table to linearize them. The W value is used to index the delta ACC tables to get values to add to the linear R G and B values. These plus the W are run through the 4 (R G B and W) output gamma tables. The result values which are in the same non-linear space as the original measurements. So these values can be used to index the conditioned measurements (before linearization). These measurements are in CIE xyY which have to be converted to CIE XYZ so that they can be summed together. Then the sum is converted back to xyY for plotting and comparison to the short-cut and to the measured data. This also resulted in a good match between theory, practice and practicality.

The invention is not limited to the embodiments described above. Other embodiments and variations are within the scope of the invention, as defined by the appended claims.

The invention claimed is:

1. An apparatus for displaying an image, the apparatus comprising circuitry for correcting, for a display's transfer characteristic, a color signal representing one or more colors in the image, the color signal comprising values of color coordinates of each of the one or more colors, the color coordinates being associated with a plurality of primary colors, the primary colors comprising a plurality of first primary colors including a red color, a green color and a blue color, and one or more second primary colors, the color coordinates of each color comprising first coordinates associated with the first primary colors and comprising one or more second coordinates associated with the one or more second primary colors, the circuitry comprising:

- a conversion circuit for generating the first coordinates associated with the first primary colors and the one or more second coordinates associated with the one or more second primary colors;
- a first luminance correction circuit for generating a first signal incorporating a first correction of the color signal, the first correction being to correct for the display's transfer characteristic, the first signal being dependent on values of one or more of the first coordinates in the color signal;
- a second luminance correction circuit for generating a second signal incorporating a second correction of the color signal, the second correction being to correct for the display's transfer characteristic, the second signal being independent of values of the first coordinates in the color signal but being dependent on values of one or more of the one or more second coordinates in the color signal;
- a chroma correction circuit for generating color chrominance shift compensation values for the first primary colors using the color signal representing at least one of the second primary colors, wherein the color chrominance shift compensation values for the first primary colors is independent of amounts of the first primary colors but is dependent on one or more of amounts of the one or more second primary colors;
- a saturation parameter generating circuit for generating a saturation parameter, the saturation parameter being a relative-amount signal that represents an indication as to a relative amount of the values of one or more of the one or more second coordinates relative to the values of one or more of the first coordinates; and
- an interpolation circuit for generating a combined-correction signal by interpolation from the first signal, the color chrominance shift compensation value and the saturation parameter based on an indication of a relative amount of at least one of the one or more second primary colors relative to at least one of the first primary colors.

2. The apparatus of claim 1 wherein the first signal is independent of the values of the one or more second coordinates in the color signal.

3. The apparatus of claim 1 wherein the interpolation is linear.

4. The apparatus of claim 1 wherein the relative amount is an increasing function of values of one or more of the one or more second coordinates and is a decreasing function of values of one or more of the first coordinates.

5. The apparatus of claim 1 wherein the combined-correction signal defines the combined correction as one or more grey values in a non-linear color space.

6. The apparatus of claim 1 wherein the color coordinates of each color are in a linear color space.

7. The apparatus of claim 1 wherein each second primary color is representable as a mixture of two or more of the first primary colors.

* * * * *